US010133456B2

(12) United States Patent
Kanda et al.

(10) Patent No.: US 10,133,456 B2
(45) Date of Patent: Nov. 20, 2018

(54) COMMUNICATION TERMINAL, COMMUNICATION FUNCTION STARTING METHOD, AND COMPUTER-READABLE RECORDING MEDIUM

(71) Applicants: Hiroyuki Kanda, Kanagawa (JP); Takahiro Asai, Kanagawa (JP)

(72) Inventors: Hiroyuki Kanda, Kanagawa (JP); Takahiro Asai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 660 days.

(21) Appl. No.: 14/395,270

(22) PCT Filed: May 1, 2013

(86) PCT No.: PCT/JP2013/063224
§ 371 (c)(1),
(2) Date: Oct. 17, 2014

(87) PCT Pub. No.: WO2013/165023
PCT Pub. Date: Nov. 7, 2013

(65) Prior Publication Data
US 2015/0121253 A1 Apr. 30, 2015

(30) Foreign Application Priority Data

May 1, 2012 (JP) .................................. 2012-104418
Apr. 10, 2013 (JP) .................................. 2013-081931

(51) Int. Cl.
*G06F 3/0484* (2013.01)
*H04N 19/187* (2014.01)
(Continued)

(52) U.S. Cl.
CPC ...... *G06F 3/04842* (2013.01); *G06F 3/04817* (2013.01); *H04L 65/403* (2013.01);
(Continued)

(58) Field of Classification Search
CPC ............ G06F 3/04842; G06F 3/04817; H04N 19/162; H04N 7/15; H04N 19/103;
(Continued)

(56) References Cited

U.S. PATENT DOCUMENTS 5,477,546 A * 12/1995 Shibata .................... H04N 7/14
348/14.1
5,533,110 A 7/1996 Pinard
(Continued)

FOREIGN PATENT DOCUMENTS

CN 1798402 A 7/2006
DE 10 2005 037 586 A1 2/2007
(Continued)

OTHER PUBLICATIONS

Dalgic et al. Comparison of H.323 and SIP for IP Telephony Signaling. in Proceedings of SPIE. Multimedia Systems and Applications II, ser. Proceedings of Photonics East, Tescher, Vasudev, Bove, and Derryberry, Eds., vol. 3845. Boston, Massachusetts. USA: The International Society for Optical Engineering (SPIE), Sep. 20- 22, 1999. 17 pages.*
(Continued)

*Primary Examiner* — Amy M Levy
(74) *Attorney, Agent, or Firm* — Oblon, McClelland, Maier & Neustadt, L.L.P.

(57) ABSTRACT

A communication terminal includes a display control unit configured to display, on a display unit, a function selecting screen that contains a first icon for receiving a selection of a first communication function and a second icon for receiving a selection of a second communication function. The first communication function is to provide communication using a signaling protocol for connecting to or disconnecting from a destination of communication and an encoding protocol for encapsulating communication data in IP pack-
(Continued)

ets. The second communication function is to provide communication using the same signaling protocol and a different encoding protocol. The communication terminal also includes a receiving unit configured to receive a selection of the first icon or the second icon; and a starting unit configured to start the first communication function and the second communication function in response to the selection of the first icon and the second icon, respectively.

9 Claims, 19 Drawing Sheets

(51) Int. Cl.
| | |
|---|---|
| H04N 19/103 | (2014.01) |
| H04N 19/162 | (2014.01) |
| H04L 29/06 | (2006.01) |
| H04N 7/15 | (2006.01) |
| G06F 3/0481 | (2013.01) |
| H04M 1/725 | (2006.01) |

(52) U.S. Cl.
CPC ...... *H04M 1/72583* (2013.01); *H04N 19/103* (2014.11); *H04N 19/162* (2014.11); *H04N 19/187* (2014.11); H04M 2250/62 (2013.01); H04N 7/15 (2013.01)

(58) Field of Classification Search
CPC ............... H04N 19/187; H04L 65/403; H04M 1/72583; H04M 2250/62
See application file for complete search history.

(56) References Cited

U.S. PATENT DOCUMENTS

| | | | |
|---|---|---|---|
| 5,842,142 A | | 11/1998 | Murray et al. |
| 5,999,966 A | * | 12/1999 | McDougall ............ H04M 3/567 348/14.09 |
| 6,535,240 B2 | | 3/2003 | Yang et al. |
| 7,185,054 B1 | | 2/2007 | Ludwig |
| 7,343,008 B1 | * | 3/2008 | Frankel ................... H04M 3/56 370/260 |
| 7,349,000 B2 | | 3/2008 | McDonald |
| 7,492,387 B2 | | 2/2009 | Yang et al. |
| 7,616,591 B2 | | 11/2009 | Yang |
| 7,646,736 B2 | | 1/2010 | Yang et al. |
| 7,768,998 B1 | | 8/2010 | Everson et al. |
| 7,920,493 B2 | * | 4/2011 | Jabri ................. H04L 29/06027 370/310 |
| 8,125,932 B2 | | 2/2012 | Yang |
| 8,164,618 B2 | | 4/2012 | Yang et al. |
| 8,208,002 B2 | | 6/2012 | Saleh et al. |
| 8,264,519 B2 | | 9/2012 | Lunde et al. |
| 8,339,440 B2 | | 12/2012 | Wang |
| 8,358,327 B2 | | 1/2013 | Duddy et al. |
| 8,412,660 B2 | * | 4/2013 | Yanagisawa ............ G06F 17/10 706/46 |
| 8,471,890 B1 | | 6/2013 | Golas |
| 8,619,949 B2 | | 12/2013 | Mishra et al. |
| 8,786,667 B2 | | 7/2014 | Shanmukhadas et al. |
| 8,839,129 B2 | * | 9/2014 | Lau ......................... G06F 3/0488 715/769 |
| 8,988,486 B2 | | 3/2015 | Golas |
| 9,094,476 B1 | * | 7/2015 | Singh ....................... G06F 3/00 |
| 9,407,867 B2 | | 8/2016 | Shanmukhadas et al. |
| 2002/0075304 A1 | | 6/2002 | Thompson |
| 2002/0147777 A1 | | 10/2002 | Hackbarth |
| 2003/0076353 A1 | | 4/2003 | Blackstock |
| 2003/0105820 A1 | * | 6/2003 | Haims ..................... G06Q 10/10 709/205 |
| 2004/0006595 A1 | | 1/2004 | Yeh |
| 2004/0022202 A1 | | 2/2004 | Yang et al. |
| 2004/0107293 A1 | | 6/2004 | Okura |
| 2006/0093022 A1 | | 5/2006 | Ukai et al. |
| 2006/0246934 A1 | * | 11/2006 | Patel ..................... H04L 63/104 455/519 |
| 2007/0165644 A1 | | 7/2007 | Rossler |
| 2007/0171273 A1 | | 7/2007 | Saleh et al. |
| 2008/0101338 A1 | | 5/2008 | Reynolds et al. |
| 2008/0140886 A1 | | 6/2008 | Izutsu |
| 2009/0031253 A1 | | 1/2009 | Lee et al. |
| 2009/0075633 A1 | * | 3/2009 | Lee .................... H04M 1/72583 455/412.2 |
| 2009/0117936 A1 | * | 5/2009 | Maeng .............. H04M 1/72547 455/550.1 |
| 2009/0138605 A1 | * | 5/2009 | Handa ................. H04L 12/1818 709/227 |
| 2009/0175264 A1 | * | 7/2009 | Reitalu ............... H04M 1/2535 370/352 |
| 2009/0316686 A1 | * | 12/2009 | Mandre ............... H04L 12/1818 370/352 |
| 2010/0077114 A1 | | 3/2010 | Izutsu |
| 2010/0167767 A1 | * | 7/2010 | Okada ..................... H04M 3/56 455/500 |
| 2010/0262928 A1 | | 10/2010 | Abbott |
| 2011/0090949 A1 | * | 4/2011 | Gu .......................... H04N 7/152 375/240.01 |
| 2011/0183713 A1 | | 7/2011 | Izutsu |
| 2011/0216699 A1 | | 9/2011 | Umehara et al. |
| 2011/0234746 A1 | | 9/2011 | Saleh et al. |
| 2012/0002003 A1 | | 1/2012 | Okita et al. |
| 2012/0056973 A1 | | 3/2012 | Yano |
| 2012/0140022 A1 | | 6/2012 | Kato et al. |
| 2012/0206562 A1 | | 8/2012 | Yang et al. |
| 2012/0252537 A1 | | 10/2012 | Izutsu |
| 2012/0274733 A1 | | 11/2012 | Yano |
| 2012/0287229 A1 | | 11/2012 | Yang et al. |
| 2012/0327173 A1 | * | 12/2012 | Couse ................. H04L 12/1822 348/14.03 |
| 2013/0117373 A1 | | 5/2013 | Umehara |
| 2013/0198397 A1 | * | 8/2013 | Zhang .................... H04W 4/001 709/228 |
| 2013/0278710 A1 | * | 10/2013 | Mock ..................... H04N 7/152 348/14.03 |
| 2013/0298031 A1 | | 11/2013 | Kanda et al. |
| 2014/0082416 A1 | | 3/2014 | Mishra et al. |
| 2014/0375757 A1 | | 12/2014 | Asai |
| 2015/0146095 A1 | | 5/2015 | Yano |
| 2015/0189237 A1 | | 7/2015 | Asai |

FOREIGN PATENT DOCUMENTS

| | | |
|---|---|---|
| JP | 2000-069556 | 3/2000 |
| JP | 2001-326972 | 11/2001 |
| JP | 2003-153223 | 5/2003 |
| JP | 2003-348549 | 12/2003 |
| JP | 2004-178472 | 6/2004 |
| JP | 2004-214934 | 7/2004 |
| JP | 2007-060646 | 3/2007 |
| JP | 2008-99261 | 4/2008 |
| JP | 2008-147921 | 6/2008 |
| JP | 2008-182463 | 8/2008 |
| JP | 2008-227577 | 9/2008 |
| JP | 2011-521570 | 7/2011 |
| JP | 2012-054813 | 3/2012 |
| JP | 2013-153419 A | 8/2013 |
| WO | WO 2008/150351 A1 | 12/2008 |
| WO | WO 2012/014824 A1 | 2/2012 |

OTHER PUBLICATIONS

Office Action dated Sep. 1, 2016, in co-pending U.S. Appl. No. 14/644,981.
Extended European Search Report dated Apr. 9, 2015, in Patent Application No. 13784564.0.
Office Action dated Jun. 19, 2015 in co-pending U.S. Appl. No. 14/644,981.
Combined Chinese Office Action and Search Report dated Dec. 8, 2015 in Patent Application No. 201380022759.3 (with English Translation).

(56) References Cited

OTHER PUBLICATIONS

Office Action dated Nov. 25, 2015, in co-pending U.S. Appl. No. 14/644,981.
Office Action dated Jan. 17, 2017 in co-pending U.S. Appl. No. 14/644,981.
Wilbert O. Galitz, "The Essential Guide to User Interface Design", Second Edition, Chapter 4, 2002, pp. 249-335.
International Search Report dated Jun. 25, 2013 in PCT/JP13/063224 Filed May 1, 2013.
Office Action dated May 16, 2017 in Japanese Patent Application No. 2013-081931.
Office Action dated Aug. 23, 2017, in co-pending U.S. Appl. No. 14/644,981.

* cited by examiner

FIG.10

VISUAL INFORMATION MANEGEMENT TABLE

| OPERATION STATUS | VISUAL INFORMATION (ICON) |
|---|---|
| ON-LINE (AVAILABLE) | |
| ON-LINE (CALLING) | |
| ON-LINE (TEMPORARILY UNAVAILABLE) | |
| OFF-LINE | |
| RUNNING NON-DEDICATED TERMINAL FUNCTION | |

FIG.11

RELAY DEVICE MANAGEMENT TABLE

| RELAY DEVICE ID | OPERATION STATUS | RECEPTION DATE AND TIME | IP ADDRESS OF RELAY DEVICE | MAXIMUM DATA COMMUNI- CATION RATE (Mbps) |
|---|---|---|---|---|
| 111a | ONLINE | 2011.11.10.13:00 | 1.2.1.2 | 100 |
| 111b | ONLINE | 2011.11.10.13:10 | 1.2.2.2 | 1000 |
| 111c | ONLINE | 2011.11.10.13:20 | 1.3.1.2 | 10 |

FIG.12

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.13

TERMINAL STATUS MANAGEMENT TABLE

| TERMINAL ID | TERMINAL NAME | OPERATION STATUS | RECEIVING TIME AND DATE | IP ADDRESS OF TERMINAL |
|---|---|---|---|---|
| 01aa | TERMINAL AA, TOKYO OFFICE, JAPAN | ON-LINE (AVAILABLE) | 2009.11.10.13:40 | 1.2.1.3 |
| 01ab | TERMINAL AB, TOKYO OFFICE, JAPAN | ON-LINE (TEMPORARILY UNAVAILABLE) | 2009.11.09.12:00 | 1.2.1.4 |
| ... | ... | ... | ... | ... |
| 01ba | TERMINAL BA, OSAKA OFFICE, JAPAN | OFF-LINE | 2009.11.10.13:45 | 1.2.2.3 |
| 01bb | TERMINAL BB, OSAKA OFFICE, JAPAN | ON-LINE (AVAILABLE) | 2009.11.10.13:50 | 1.2.2.4 |
| ... | ... | ... | ... | ... |
| 01ca | TERMINAL CA, NEW YORK OFFICE, USA | ON-LINE (AVAILABLE) | 2009.11.10.12:45 | 1.3.1.3 |
| 01cb | TERMINAL CB, NEW YORK OFFICE, USA | RUNNING NON-DEDICATED TERMINAL FUNCTION | 2009.11.10.13:55 | 1.3.1.4 |
| ... | ... | ... | ... | ... |

FIG.14

DESTINATION LIST MANAGEMENT TABLE

| REQUEST SOURCE TERMINAL ID | DESTINATION TERMINAL ID |
|---|---|
| 01aa | 01ab, ···, 01ba, 01bb, ···, 01ca, 01cb |
| ... | ... |
| 01ba | 01aa, 01ab, 01ca, 01cb |
| ... | ... |
| 01ca | 01aa, 01ab, 01ba, ···, 01ba, 01ca, ··· |
| ... | ... |

FIG.15

SESSION MANAGEMENT TABLE

| RELAY DEVICE ID | REQUEST SOURCE TERMINAL ID | DESTINATION TERMINAL ID | DELAY TIME (ms) | TIME AND DATE AT WHICH DELAY INFORMATION IS RECEIVED |
|---|---|---|---|---|
| 111a | 01aa | 01ca | 200 | 2009.11.10.14:00 |
| 111b | 01ba | 01cb | 50 | 2009.11.10.14:10 |
| 111c | 01bb | 01cc | 400 | 2009.11.10.14:20 |
| ... | ... | ... | ... | ... |

COMMUNICATION TERMINAL, COMMUNICATION FUNCTION STARTING METHOD, AND COMPUTER-READABLE RECORDING MEDIUM

TECHNICAL FIELD

The present invention relates to an invention for starting any of a plurality of communication functions using different communication systems.

BACKGROUND ART

Recently having come into general use is a communication system for enabling a teleconference over a communication network such as the Internet, because of a demand for cutting a traveling cost and traveling time. When such a communication system is used, a teleconference can be held by allowing image data and audio data to be exchanged among a plurality of communication terminals (see Japanese Patent Application Laid-open No. 2008-227577).

In addition, disclosed is a video phone system providing one communication terminal with two different communication functions using different communication protocols, e.g., the personal digital cellular (PDC) protocol and the personal handy phone system (PHS), respectively, and communication is established while switching these two different communication protocols (see Japanese Patent Application Laid-open No. 2001-326972).

In these conventional two communication protocols, a signaling protocol for connecting to and disconnecting from a destination and an encoding protocol for encoding call data are both different. In other words, such a conventional communication terminal is a single housing merely provided with two different communication functions using completely different communication protocols, and causing one of the functions to operate exclusively. Therefore, it has been impossible for a plurality of communication functions using the same signaling protocol but different encoding protocols to be used on the same terminal.

DISCLOSURE OF INVENTION

It is an object of the present invention to at least partially solve the problems in the conventional technology.

According to an embodiment, there is provided a communication terminal that includes a display control unit configured to display, on a display unit, a function selecting screen that contains a first icon for receiving a selection of a first communication function and a second icon for receiving a selection of a second communication function, the first communication function being to provide communication using a signaling protocol for connecting to or disconnecting from a destination of communication and an encoding protocol for encapsulating communication data in internet protocol (IP) packets, the second communication function being to provide communication using the signaling protocol of the first communication function and an encoding protocol different from that of the first communication function; a receiving unit configured to receive a selection of the first icon or the second icon; and a starting unit configured to start the first communication function in response to the selection of the first icon, and start the second communication function in response to the selection of the second icon.

According to another embodiment, there is provided a communication function starting method that includes displaying, on a display unit, a function selecting screen that contains a first icon for receiving a selection of a first communication function and a second icon for receiving a selection of a second communication function, the first communication function being to provide communication using a signaling protocol for connecting to or disconnecting from a destination of communication and an encoding protocol for encapsulating communication data in internet protocol (IP) packets, the second communication function being to provide communication using the signaling protocol of the first communication function and an encoding protocol different from that of the first communication function; receiving a selection of the first icon or the second icon; starting the first communication function in response to the selection of the first icon; and starting the second communication function in response to the selection of the second icon.

According to still another embodiment, there is provided a computer-readable recording medium with an executable program stored thereon. The program instructs a computer to execute the communication function starting method according to the above embodiment.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 10 is a conceptual schematic illustrating a visual information management table;

FIG. 11 is a conceptual schematic illustrating a relay device management table;

FIG. 12 is a conceptual schematic illustrating a terminal authentication management table;

FIG. 13 is a conceptual schematic illustrating a terminal status management table;

FIG. 14 is a conceptual schematic illustrating a destination list management table;

FIG. 15 is a conceptual schematic illustrating a session management table;

BEST MODE(S) FOR CARRYING OUT THE INVENTION

An embodiment of the present invention will now be explained with reference to FIGS. 1 to 20.

Overall Configuration According to Embodiment

Figure 1:
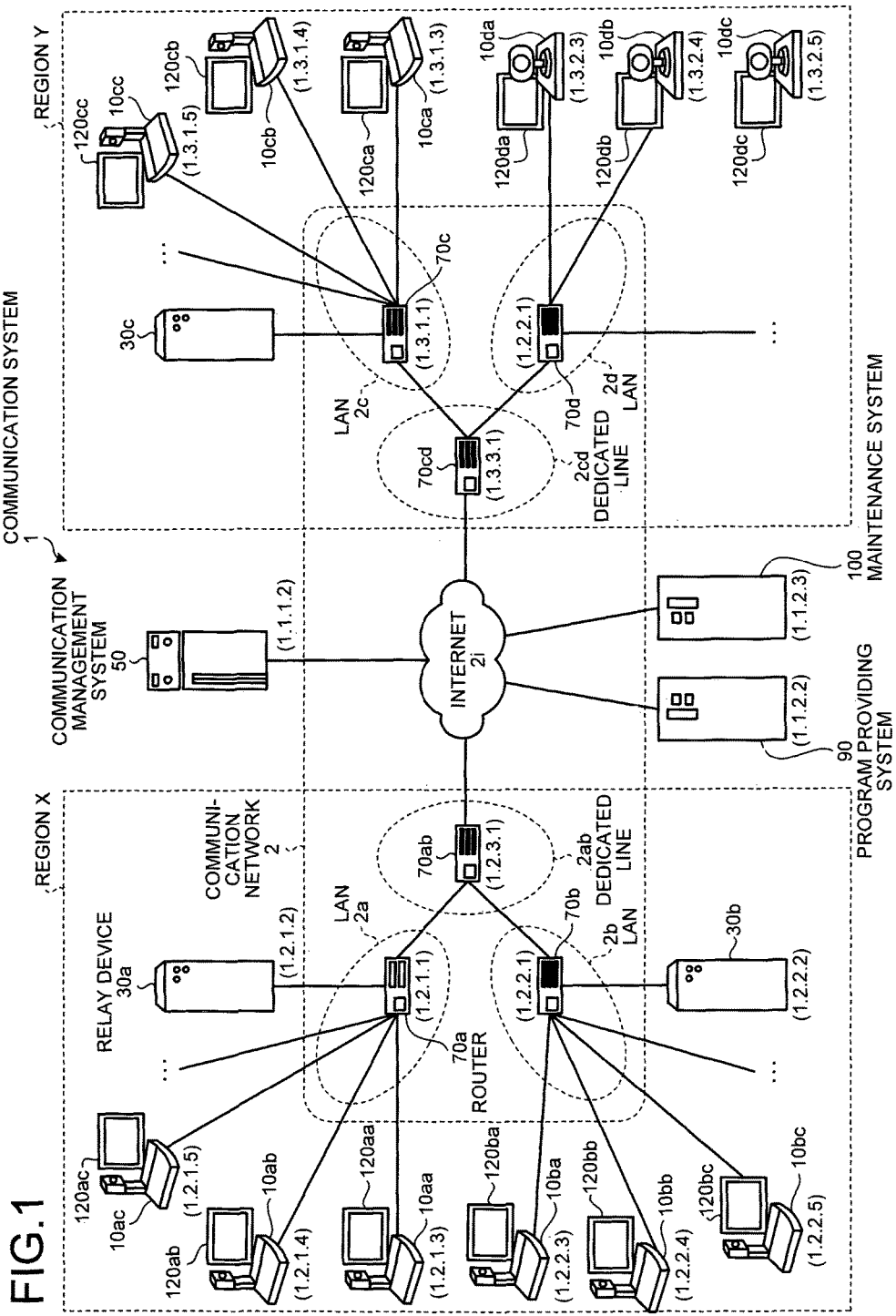
FIG. 1 is a general schematic of a communication system according to an embodiment according to the present invention.

FIG. 1 is a general schematic of a communication system according to the embodiment. As illustrated in FIG. 1, this communication system 1 includes a plurality of communication terminals (10aa, 10ab, ... ), a plurality of displays (120aa, 120ab, ... ) for the respective communication terminals (10aa, 10ab, ... ), a plurality of relay devices (30a, 30b, 30c), a communication management system 50, a program providing system 90, and a maintenance system 100. By allowing image data and audio data, which are examples of communication data (call data), to be exchanged over the communication system 1, a teleconference or the like can be held across remote locations. A plurality of routers (70a, 70b, 70c, 70d, 70ab, 70cd) selects the most optimal route for communication data.

The communication terminals (10aa, 10ab, 10ac, ... ), the relay device 30a, and the router 70a are connected communicatively over a local area network (LAN) 2a. The communication terminals (10ba, 10bb, 10bc, ... ), the relay device 30b, and the router 70b are connected communicatively over a LAN 2b. The LAN 2a and the LAN 2b are connected communicatively over a dedicated line 2ab including the router 70ab. The LAN 2a, the LAN 2b, and the dedicated line 2ab are deployed in a given region X. An example of the region X is Japan, and the LAN 2a is deployed in an office in Tokyo, and the LAN 2b is deployed an office in Osaka, for example.

The communication terminals (10ca, 10cb, 10cc, ... ), the relay device 30c, and the router 70c are connected, communicatively over a LAN 2c. The communication terminals 10d (10da, 10db, 10dc, ... ), the relay device 30d, and the router 70d are connected communicatively over a LAN 2d. The LAN 2c and the LAN 2d are connected communicatively over a dedicated line 2cd including the router 70cd. The LAN 2c, the LAN 2d, and the dedicated line 2cd are deployed in a given region Y. An example of the region Y is the United States, and the LAN 2c is deployed in an office in New York, and the LAN 2d is deployed in an office in Washington D.C., for example. The region X and the region Y are connected communicatively over an Internet 2i via the respective routers (70ab, 70cd).

In the explanation below, the "communication terminal" is simply referred to as a "terminal", and the "communication management system" is simply referred to as a "management system". Any one of the terminals (10aa, 10ab, ... ) is referred to as a "terminal 10", and any one of the displays (120aa, 120ab, ... ) is referred to as a "display 120". Any one of the relay devices (30a, 30b, 30c) is referred to as a "relay device 30". A terminal serving as a requestor requesting to start a teleconference is referred to as a "request source terminal". A destination (terminal to which data is to be relayed) that is a requested terminal is referred to as a "destination terminal". Any one of the routers (70a, 70b, 70c, 70d, 70ab, 70cd) is referred to as a "router 70".

The management system 50, the program providing system 90, and the maintenance system 100 are connected to the Internet 2i. The management system 50, the program providing system 90, and the maintenance system 100 may be deployed in the region X or in the region Y, or may be deployed in any region other than these locations.

In the embodiment, a communication network 2 according to the embodiment includes the LAN 2a, the LAN 2b, the dedicated line 2ab, the Internet 2i, the dedicated line 2cd, the LAN 2c, and the LAN 2d. The communication network 2 may include some wirelessly communicating parts, e.g., parts communicating over Wireless Fidelity (WiFi) or Bluetooth (registered trademark), as well as those communicating over the wire.

In FIG. 1, a set of four numbers indicated below each of the terminals 10, each of the relay devices 30, the management system 50, each of the routers 70, the program providing system 90, and the maintenance system 100 represents a general internet protocol (IP) address that is based on the Internet Protocol version 4 (IPv4), in a simplified manner. The IP address of the terminal 10aa is "1.2.1.3", for example. The IPv6 may be used instead of the IPv4, but the IPv4 is used as an example, to simplify the explanation.

Each of the terminals 10 may be used to achieve communication within the same room, communication between an outdoor location and an indoor location, or communication between an outdoor location and another outdoor location, in addition to communication between offices or communication between different rooms in the same office. When the terminals 10 are used outdoor, the terminals 10 communicates with each other wirelessly, e.g., over a cellular network.

Each of the terminals 10 illustrated in FIG. 1 is a terminal that exchanges communication data to enable communication between users. An example of the terminal 10 is a teleconference terminal. The terminal 10 exchanges communication data using a given communication system (a signaling protocol for connecting to and disconnecting from a destination of communication and an encoding protocol for encapsulating communication data (call data) in an IP packet).

Examples of the signaling protocol include (1) the Session Initiation Protocol (SIP), (2) H.323, (3) an SIP extension, (4) an instant messenger protocol, (5) a protocol using a MESSAGE method defined in the SIP, (6) the Internet Relay Chat (IRC) protocol, and (7) an instant messenger protocol extension. Among these examples, (4) the instant messenger protocol is a protocol used in (4-1) the Extensible Messaging and Presence Protocol (XMPP), or (4-2) ICQ (registered trademark), AOL Instant Messenger (AIM) (registered trademark), or Skype (registered trademark). An example of (7) an instant messenger protocol extension includes Jingle.

Among these terminals 10, a terminal 10 using a communication system in which the instant messenger protocol (or the instant messenger protocol extension) is used as a signaling protocol and Scalable Video Coding (SVC) is used as the encoding protocol, for example, is referred to as a "dedicated terminal". Among these terminals 10, a terminal 10 using a communication system that uses a different signaling protocol and encoding protocol from those used in a dedicated terminal are referred to as a "non-dedicated terminal". In the embodiment, as examples of two terminals operating on different communication protocols, a "dedicated terminal" is explained to be a terminal manufactured, sold, or managed by a particular company, and a "non-dedicated terminal" is explained to be a terminal manufactured, sold, or managed by a company other than the particular company. Such examples are used in the description of the embodiment because terminals manufactured, sold, or managed by different companies often use different communication systems. Alternatively, as examples of such two terminals operating on different communication protocols, a "dedicated terminal" may be a terminal manufactured or sold later in time, and a "non-dedicated terminal" may be a terminal manufactured or sold earlier in time, among those manufactured or sold by the same company. A dual codec terminal having the dedicated terminal function and the non-dedicated terminal function establishes communication using an encoding system that is the same as that used by a peer by starting one of the dedicated terminal function and the non-dedicated terminal function. In other words, by starting the dedicated terminal function, a dual codec terminal can communicate with a dedicated terminal using the same encoding protocol. By starting the non-dedicated terminal function, a dual-codec terminal can communicate with the non-dedicated terminal using the same encoding protocol.

Each of the relay devices 30 is a computer system that relays communication data between the terminals 10. The management system 50 is a computer system that centrally manages authentications of log-in performed by the terminals 10, the operations status and the communication status of the terminals 10, a destination list, and the communication status of the relay devices 30. An image represented by the image data may be a moving image, a still image, or both.

The program providing system 90 is a computer system that provides computer programs used by the terminals 10, the relay devices 30, the management system 50, and the maintenance system 100, respectively, to the terminals 10, the relay devices 30, the management system 50, and the maintenance system 100, respectively, over the communication network 2.

The maintenance system 100 is a computer system that maintains, manages, or services at least one of the terminals 10, the relay devices 30, the management system 50, and the program providing system 90. For example, when the maintenance system 100 is deployed in a domestic location, and the terminals 10, the relay devices 30, the management system 50, or the program providing system 90 are deployed in an oversea location, the maintenance system 100 remotely performs maintenance such as maintaining, managing, and servicing at least one of the terminals 10, the relay devices 30, the management system 50, and the program providing system 90 over the communication network 2. The maintenance system 100 also performs maintenance such as managing unit numbers, serial numbers, customers, the history of maintenance and inspections, and the history of failures in at least one of the terminals 10, the relay devices 30, the management system 50, and the program providing system 90, not over the communication network 2.

Figure 2:
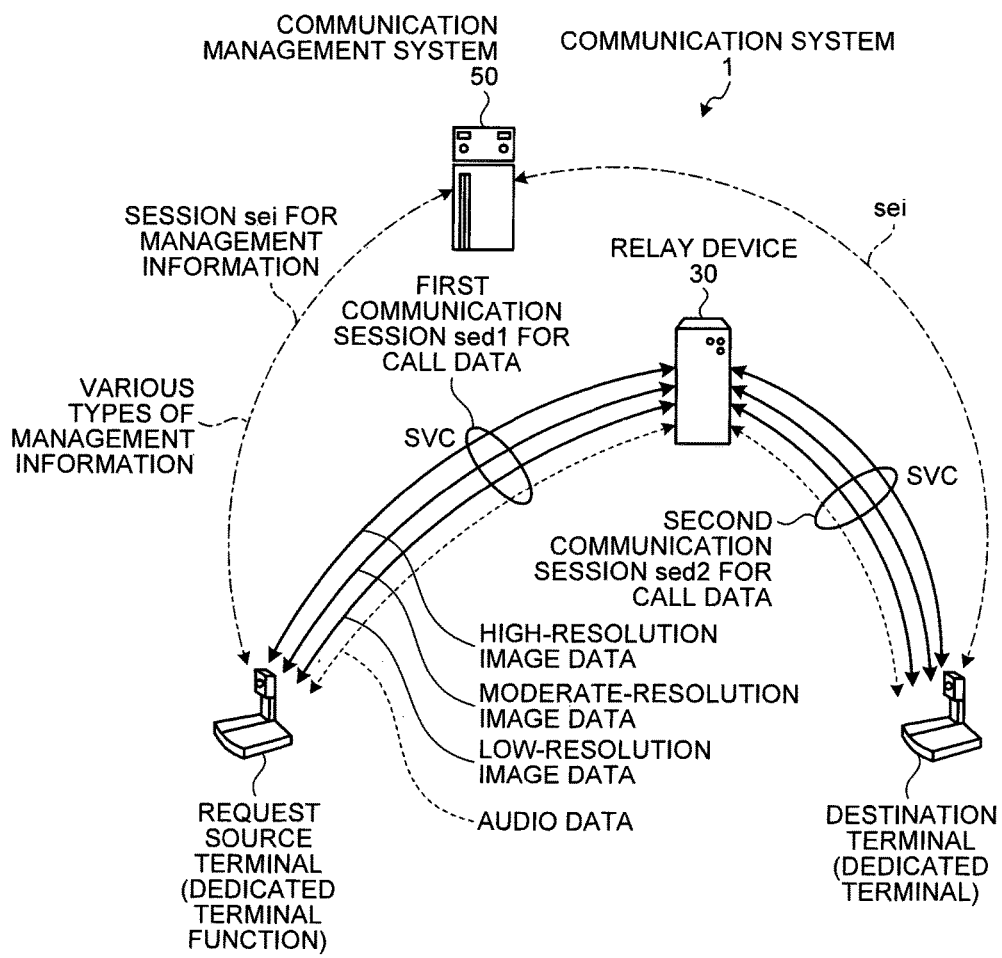
FIG. 2 is a conceptual schematic illustrating communications exchanged when communication is established between communication terminals having a dedicated terminal function.
Figure 3:
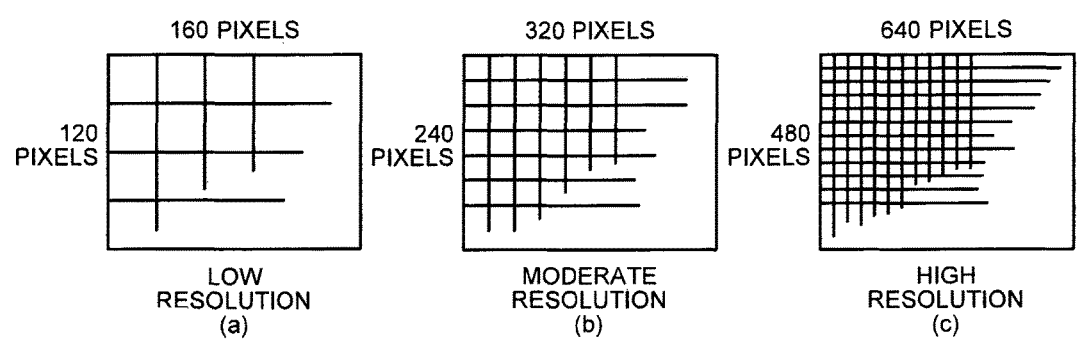
FIG. 3 is a conceptual schematic illustrating image qualities of image data exchanged according to Scalable Video Coding (SVC) standard illustrated in FIG. 2.

A first communication pattern for enabling communication between the two terminals 10 will now be explained with reference to FIGS. 2 and 3. FIG. 2 is a conceptual schematic illustrating communications exchanged when communication is established between communication terminals having a dedicated terminal function. The terminals 10 include some dedicated terminals, some non-dedicated terminals, and some dual codec terminals having a dedicated terminal function (an example of a first communication function) and a non-dedicated terminal function (an example of a second communication function). A non-dedicated terminal herein means a terminal operating on a signaling protocol and an encoding protocol that are different from those used on the dedicated terminal, as mentioned earlier. A non-dedicated terminal function means a terminal function operating on the same signaling protocol as the dedicated terminal function but on a different encoding protocol from the dedicated terminal function.

Among these terminals, only a dedicated terminal and a terminal running the dedicated terminal function are used in the communication system 1 executing the first communication pattern, as illustrated in FIG. 2. Illustrated in FIG. 2 is an example in which the request source terminal is a dual codec terminal 10 that is running a dedicated terminal function. The destination terminal is a dedicated terminal.

The communication system 1 exchanges communication data over a communication system that uses the instant messenger protocol (or the instant messenger extension protocol) as a signaling protocol and H.264/Scalable Video Coding as an encoding protocol, for example. Specifically, as illustrated in FIG. 2, in the communication system 1, a management communication session sei for exchanging various types of management information is established between the request source terminal and the destination terminal via the management system 50. The communication session sei also serves as a signaling session.

Established between the request source terminal running the dedicated terminal function and the relay device 30 is a first communication session sed1 for exchanging four types of communication data including high-resolution image data, moderate-resolution image data, low-resolution image data, and audio data over the SVC encoding protocol. Established between the relay device 30 and the destination terminal is a second communication session sed2 for exchanging four types of communication data including high-resolution image data, moderate-resolution image data, low-resolution image data, and audio data over the SVC encoding protocol in the same manner.

The resolutions of the images in the image data handled in the first communication pattern illustrated in FIG. 2 will now be explained with reference to FIG. 3. FIG. 3 is a conceptual schematic illustrating the image qualities of image data exchanged according to the SVC protocol illustrated in FIG. 2.

Exchanged is data of a low-resolution image having 160 pixels horizontally and 120 pixels vertically and used as a base image illustrated in FIG. 3(a), a moderate-resolution image having 320 pixels horizontally and 240 pixels vertically illustrated in FIG. 3(b), and a high-resolution image having 640 pixels horizontally and 480 pixels vertically illustrated in FIG. 3(c). Among these types of image data, when the image data is transferred over a narrowband path, the low-quality image data including a low-resolution image data which is a base image is relayed by the relay device 30. When the bandwidth is relatively broad, the low-resolution image data which is the base image and the moderate-quality image data including moderate-resolution image data are relayed by the relay device 30. When the bandwidth is highly broad, the low-resolution image data having the base image quality, the moderate-resolution image data, and the high-quality image data including high-resolution image data are relayed by the relay device 30.

Figure 4:
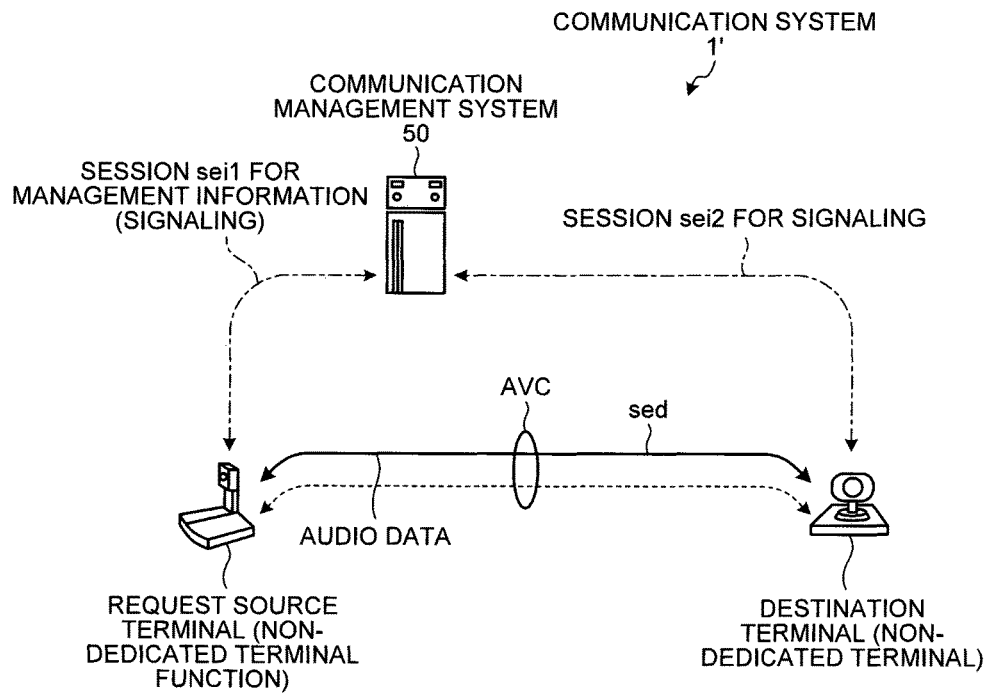
FIG. 4 is a conceptual schematic illustrating communications exchanged when communication is established between terminals having a non-dedicated terminal function.

A second communication pattern for establishing communication between the two terminals 10 will be explained with reference to FIGS. 4 and 5. FIG. 4 is a conceptual schematic illustrating communications exchanged when communication is established between terminals having a non-dedicated terminal function.

Only a non-dedicated terminal and a terminal running the non-dedicated terminal function are used in a Communication system 1' executing the second communication pattern, as illustrated in FIG. 4, and cannot be used in the communication system 1 executing the first communication pattern illustrated in FIG. 2 because a non-dedicated terminal and a terminal running the non-dedicated terminal function use a different communication system from that used by a dedicated terminal and a dedicated terminal function. Illustrated in FIG. 4 is an example in which the request source terminal is a dual codec terminal running a non-dedicated terminal function, and the destination terminal is a non-dedicated terminal.

The communication system 1' exchanges communication data over a communication system that uses an instant messenger protocol (or an instant messenger extension protocol) as a signaling protocol, which is the same as that used in the first communication pattern, and H.264/Advanced Video Coding, which is a protocol different from that used in the first communication pattern, as an encoding protocol for the request source terminal. Specifically, as illustrated in FIG. 4, a management communication session sei1 for exchanging various types of management information is established between the request source terminal and the management system 50 in the communication system P. The communication session sei1 also serves as a signaling session. Furthermore, when a non-dedicated terminal function is running on the request source terminal, the encoding protocol is converted from the SVC to the AVC.

Established between the management system 50 and the destination terminal is a communication session sei2 for signaling for the non-dedicated terminal, and a different signaling protocol is used from that used with the request source terminal. The SIP or H.323 is used as a signaling protocol, for example. In such a case, because the request source terminal and the destination terminal use different signaling protocols, the management system 50 converts the signaling protocols. Specifically, when the request source terminal is running the non-dedicated terminal function, the management system 50 converts data related to signaling based on the conversion rule data used for converting the signaling protocols, and performs the signaling. The encoding protocol used by the destination terminal (non-dedicated terminal) is the AVC, which is the same as that on the request source terminal running the non-dedicated terminal function.

Established between the request source terminal and the destination terminal is a communication session sed for exchanging communication data. The communication session sed may be established directly between the request source terminal and the destination terminal, or may be established via the relay device.

The resolution of the images in the image data handled in the second communication pattern illustrated in FIG. 4 will now be explained with reference to FIG. 5. FIG. 5 is a conceptual schematic illustrating the image quality of image data exchanged with the AVC protocol illustrated in FIG. 4. As illustrated in FIG. 5, exchanged is a single type of image data having 320 pixels horizontally and 240 pixels vertically.

Hardware Configurations According to Embodiment

Figure 6:
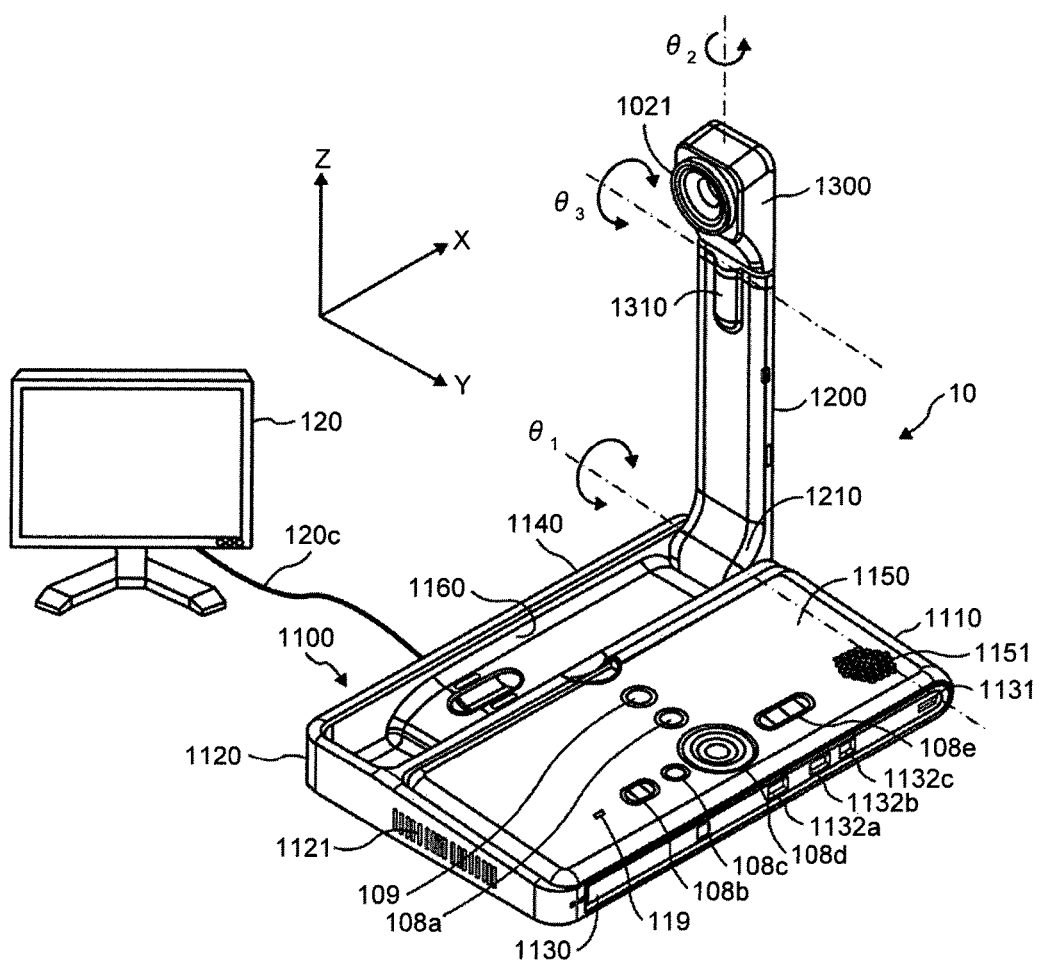
FIG. 6 is an external view of the communication terminal according to the embodiment.

Hardware configurations according to the embodiment will now be explained. FIG. 6 is an external view of the communication terminal according to the embodiment. As illustrated in FIG. 6, the terminal 10 includes a housing 1100, an arm 1200, and a camera housing 1300. Among these components, an air inlet surface having a plurality of air inlets not illustrated are provided on the front wall 1110 of the housing 1100, and an air outlet surface 1121 having a plurality of air outlets is provided on the rear wall 1120 of the housing 1100. These surfaces allows the air behind the terminal 10 to be collected via the air inlet surface by driving a cooling fan provided inside of the housing 1100, and to be discharged from the air outlet surface 1121 to the rear side of the terminal 10. On the right wall 1130 of the housing 1100, a sound collecting opening 1131 is provided so that sound such as a voice, some sound, and a noise can be collected by an internal microphone 114, which will be described later.

An operation panel 1150 is provided on the right wall 1130 of the housing 1100. The operation panel 1150 is provided with a plurality of operation buttons (108a to 108e) which will be described later, a power switch 109 which will be described later, an alarm lamp 119 which will be described later, and an audio output surface 1151 having a plurality of audio output holes through which the sound from an internal speaker 115 which will be described later is output. On the left wall 1140 of the housing 1100, a receptacle 1160 as a recess for receiving the arm 1200 and the camera housing 1300 is provided. Provided on the right wall 1130 of the housing 1100 are a plurality of connectors (1132a to 1132c) for electrically connecting cables to an external device connecting I/F 118 which will be described later. Provided on left wall 1140 of the housing 1100 is a connector not illustrated for electrically connecting a cable 120c for the display 120 to the external device connecting I/F 118 which will be described later.

In the description hereunder, the term "operation button 108" is used to indicate any one of the operation buttons (108a to 108e), and the term "connector 1132" is used to indicate any one of the connectors (1132a to 1132c).

The arm 1200 is attached to the housing 1100 via a torque hinge 1210, and the arm 1200 is provided in a manner vertically rotatable with respect to the housing 1100 within a tilt angle $\theta_1$ of 135 degrees. FIG. 6 illustrates a configuration at a tilt angle $\theta_1$ of 90 degrees. The camera housing 1300 is provided with an internal camera 112, which will be described later, to allow the image of users, documents, or a room to be captured. The camera housing 1300 is provided with the torque hinge 1310. The camera housing 1300 is attached to the arm 1200 via the torque hinge 1310. The camera housing 1300 is attached to the arm 1200 via the torque hinge 1310, and the camera housing 1300 is configured in a manner horizontally and vertically rotatable with respect to the arm 1200 within a pan angle $\theta_2$ of ±180 degrees when the position illustrated in FIG. 6 is 0 degrees, and within a tilt angle $\theta_3$ of ±45 degrees.

The relay device 30, the management system 50, the program providing system 90, and the maintenance system 100 all have the external view of a general server computer. Therefore, descriptions of the external views thereof are omitted herein.

Figure 7:
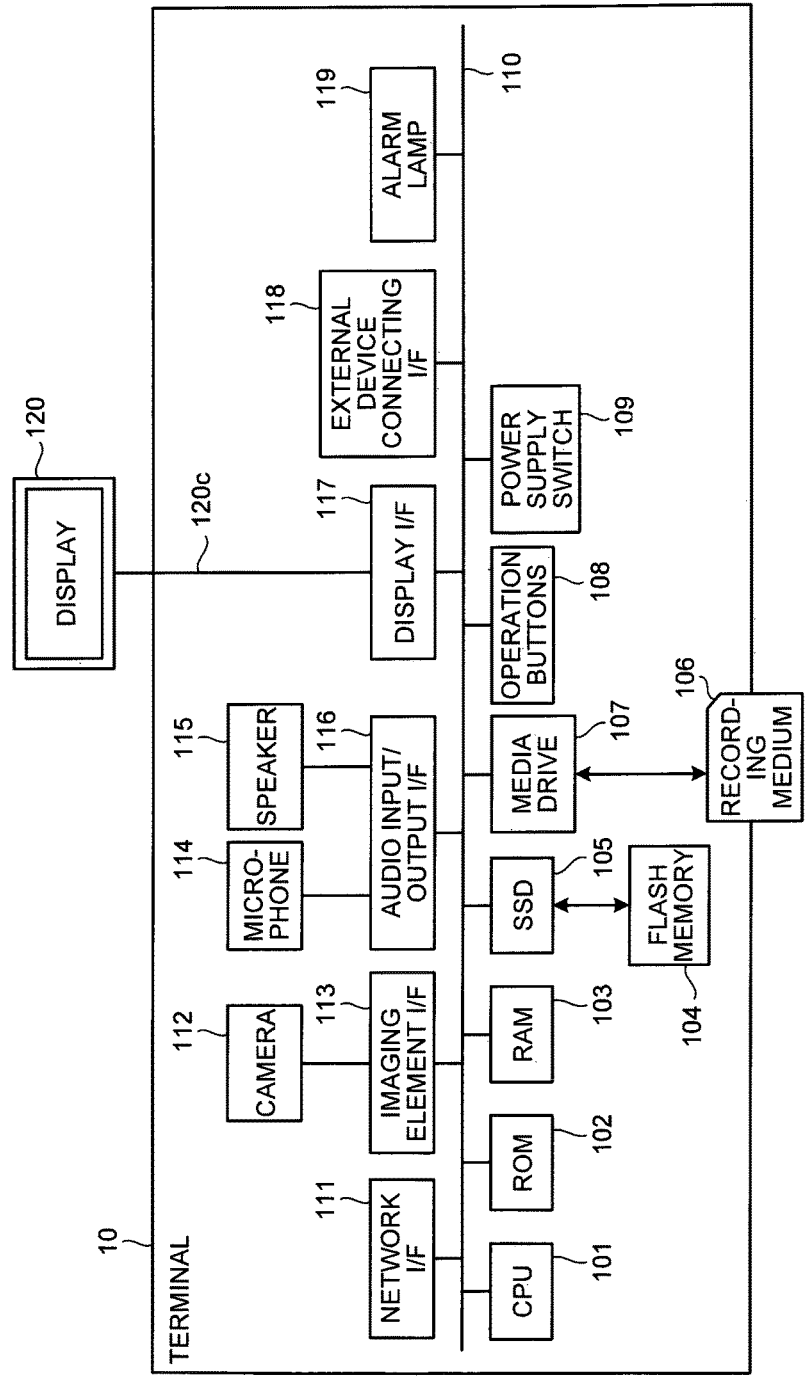
FIG. 7 is a schematic of a hardware configuration of the terminal according to the embodiment.

FIG. 7 is a schematic of a hardware configuration of the terminal according to the embodiment. As illustrated in FIG. 7, the terminal 10 according to the embodiment includes a central processing unit (CPU) 101, that controls the entire operations of the terminal 10, a read-only memory (ROM) 102 storing therein computer programs such as an initial program loader (IPL) used in driving the CPU 101, a random access memory (RAM) 103 used as a working area for the CPU 101, a flash memory 104 storing therein computer programs for the terminal 10 and various types of data such as image data and audio data, a solid state drive (SSD) 105 that controls reading and writing of various types of data from and to the flash memory 104 under the control of the CPU 101, a media drive 107 that controls reading and writing (storing) of data to a recording medium 106 such as a flash memory, the operation buttons 108 that is operated when a destination of the terminal 10 is selected, for example, the power switch 109 for powering ON and OFF the terminal 10, and a network interface (I/F) 111 for sending data out to the communication network 2.

Figure 5:
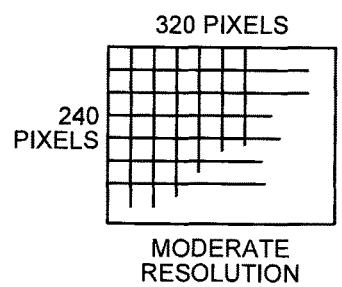
FIG. 5 is a conceptual schematic illustrating image quality of image data exchanged according to Advanced Video Coding (AVC) standard illustrated in FIG. 4.

The terminal 10 includes the internal camera 112 for acquiring image data by capturing the image of a subject under the control of the CPU 101, an imaging element I/F 113 for controlling driving of the camera 112, an internal microphone 114 for collecting sound, the internal speaker 115 for outputting sounds, an audio input/output I/F 116 that processes inputs and outputs of audio signals to and from the microphone 114 and the speaker 115 under the control of the CPU 101, a display I/F 117 that transmits image data to an externally-connected display 120 under the control of the CPU 101, the external device connecting I/F 118 for connecting various external devices, the alarm lamp 119 for informing abnormality in various functions provided to the terminal 10, and a bus line 110 such as an address bus and a data bus for electrically connecting the components listed above, as illustrated in FIG. 5.

The display 120 is a display unit configured as a liquid crystal display or an organic electroluminescence display for displaying an image of a subject or an operation screen. The display 120 is connected to the display I/F 117 over the cable 120c. The cable 120c may be a cable for analog, red, green, and blue (RGB) (video graphic array (VGA)) signals, a component video cable, a high-definition multimedia interface (HDMI) cable, or a digital video interactive (DVI) cable.

The camera 112 includes a lens, and a solid state imaging element (image sensor) that electronizes an image (video) of a subject by converting light into an electric charge. As the solid state imaging element, a complementary metal oxide semiconductor (CMOS), a charge coupled device (CCD), or the like is used.

An external device such as an external camera, an external microphone, an external speaker, and the like may be electrically connected to the external device connecting I/F 118 over a universal serial bus (USB) cable or the like inserted in the connector 1132 on the housing 1100 illustrated in FIG. 6. When an external camera is connected, the external camera is driven in a manner prioritized over the internal camera 112 under the control of the CPU 101. Similarly, when an external microphone or an external speaker is connected, the external microphone or an external speaker is driven in a manner prioritized over the internal microphone 114 or the internal speaker 115 under the control of the CPU 101.

The recording medium 106 is configured removable from the terminal 10. The recording medium 106 is not limited to the flash memory 104, but may be an electrically erasable and programmable read-only memory (EEPROM), for example, as long as such a recording medium is a nonvolatile memory from and to which data is read and written under the control of the CPU 101.

Figure 8:
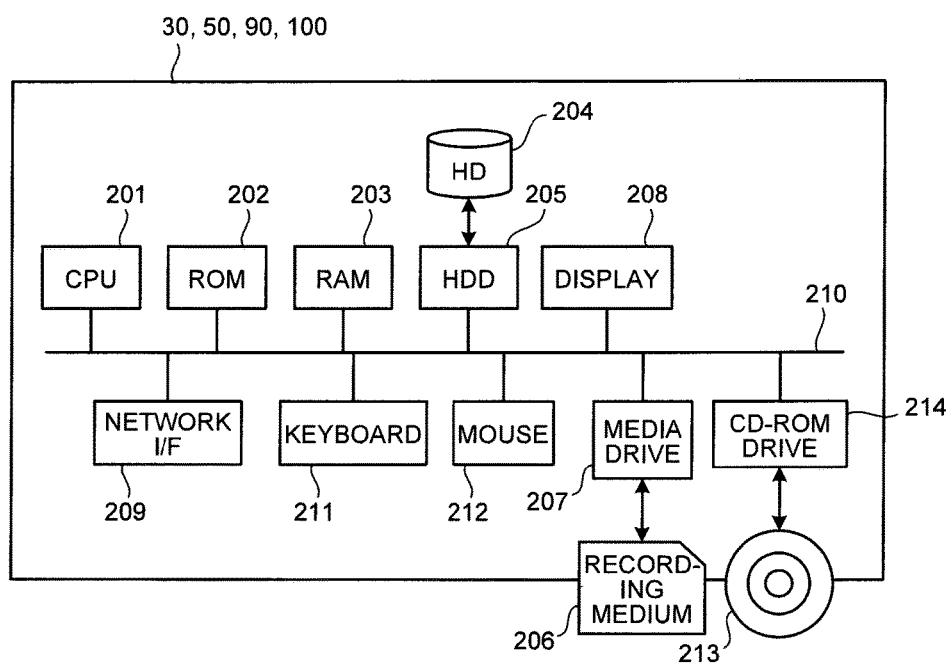
FIG. 8 is a schematic of a hardware configuration of a communication management system, a relay device, a program providing system, or a maintenance system according to the embodiment.

FIG. 8 is a schematic of a hardware configuration of the management system according to the embodiment. The management system 50 includes a CPU 201 that controls the entire operations of the management system 50, a ROM 202 storing therein computer programs such as an IPL used in driving the CPU 201, a RAM 203 used as a working area for the CPU 201, a hard disk (HD) 204 storing therein various types of data such as computer programs for the management system 50, a hard disk drive (HDD) 205 that controls reading and writing of various types of data from and to the HD 204 under the control of the CPU 201, a media drive 207 that controls reading and writing (storing) of data from and to a recording medium 206 such as a flash memory, a display 208 that displays various types of information such as a cursor, a menu, a window; characters, and an image, a network I/F 209 that exchanges data over the communication network 2, a keyboard 211 provided with a plurality of keys for allowing characters, numbers, and various instructions to be entered, a mouse 212 for allowing various instructions to be selected or executed, allowing an object to be processed to be selected, and allowing a cursor to be moved, for example, a compact disk read-only memory (CD-ROM) drive 214 that controls reading and writing of various types of data from and to a CD-ROM 213 that is an example of a removable recording medium, and a bus line 210 such as an address bus and a data bus for electrically connecting the components listed above, as illustrated in FIG. 6.

The relay device 30, the program providing system 90, and the maintenance system 100 all have the same hardware configuration as that of the management system 50. Therefore, the explanations thereof are omitted herein. The HDs 204 provided to the relay device 30, the program providing system 90, and the maintenance system 100, respectively, store therein various types of data such as a computer programs for controlling the relay device 30, the program providing system 90, and the maintenance system 100, respectively.

The computer programs for the terminal 10, the relay device 30, the program providing system 90, and the maintenance system 100 may be distributed in a manner recorded in a computer-readable recording medium (e.g. the recording medium 106) as a file in an installable or an executable format. Other examples of the recording medium includes a compact disk recordable (CD-R), a digital versatile disk (DVD), and a Blu-ray disk.

Functional Configurations According to Embodiment

Figure 9:
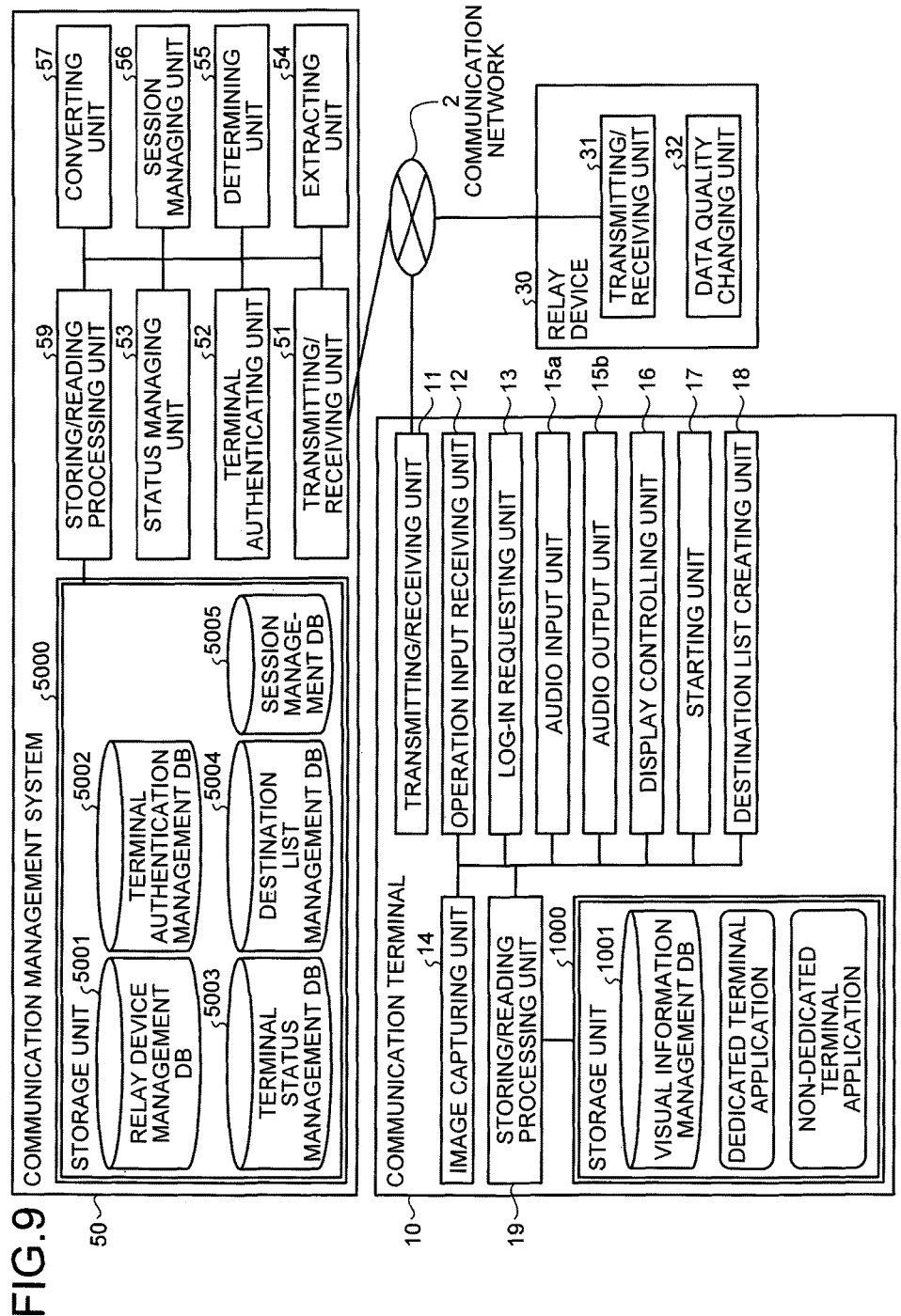
FIG. 9 is a functional block diagram of a communication terminal, a relay device, and a communication management system included in the communication system according to the embodiment.

Functional configurations according to the embodiment will now be explained. FIG. 9 is a functional block diagram of the terminal 10, the relay device 30, and the management system 50 included in the communication system 1 according to the embodiment. In FIG. 9, the terminal 10, the relay device 30, and the management system 50 are connected over the communication network 2 to enable the terminal 10, the relay device 30, and the management system 50 to exchange data.

Functional Configuration of Terminal

The terminal 10 includes a transmitting/receiving unit 11, an operation input receiving unit 12, a log-in requesting unit 13, an image capturing unit 14, an audio input unit 15a, an audio output unit 15b, a display controlling unit 16, a starting unit 17, a destination list creating unit 18, and a storing/reading processing unit 19. Each of these units is a function realized by causing one of the units illustrated in FIG. 7 to operate based on an instruction from the CPU 101 following a computer program for the terminal 10 that is loaded from the flash memory 104 onto the RAM 103.

The terminal 10 has a storage unit 1000 implemented on the RAM 103 illustrated in FIG. 7 and the flash memory 104 illustrated in FIG. 7. A visual information managing data base (DB) 1001 configured as a visual information management table, which will be described later, is implemented on the storage unit 1000. The dedicated terminal application for realizing the dedicated terminal function on the terminal 10 and a non-dedicated terminal application for realizing the non-dedicated terminal function on the terminal 10 are stored in the storage unit 1000.

Visual Information Management Table

FIG. 10 is a conceptual schematic illustrating the visual information management table. The visual information management table manages operation status information indicating the operation status of a destination terminal in a manner associated with visual information to be included in a destination list displayed on the display 120. Visual information is an icon having a shape illustrated in FIG. 10, for example. The management system 50 may transmit the visual information included in the visual information management table when a request source terminal requests to log in at Step S22, which will be described later. Alternatively, the visual information may be stored in the storage unit 1000 in the request source terminal before the terminal is shipped from the factory.

The visual information according to the embodiment is classified into first visual information visually indicating that the communication system used by the destination terminal is the same as that used by the request source terminal (dedicated terminal) and second visual information visually indicating that the communication system used by the destination terminal is not same as that used by the request source terminal (dedicated terminal) and visually different from the first visual information. The first visual information includes visual information such as icons indicating that the operation status is on-line (available), on-line (calling), on-line (temporarily unavailable), or off-line.

The second visual information represents an icon displayed on the display 120 of a request source terminal, when a terminal 10 having both of a dedicated terminal function and a non-dedicated terminal function communicates with another terminal 10 having both of the dedicated terminal function and a non-dedicated terminal function, and the request source terminal is currently running the dedicated terminal function and the destination terminal is running the non-dedicated terminal function, for example.

Each Functional Unit in Terminal

Each of the functional units in the terminal 10 will now be explained in detail with reference to FIGS. 7 and 9. While explaining each of the functional units in the terminal 10, a relationship with some of the units illustrated in FIG. 7 that are mainly used in realizing the functional unit of the terminal 10 will be explained as well.

The transmitting/receiving unit 11 included in the terminal 10 and illustrated in FIG. 9 is realized by an instruction issued by the CPU 101 illustrated in FIG. 7 and the network I/F 111 illustrated in FIG. 7. The transmitting/receiving unit 11 transmits and receives various types of data (or information) to and from with other terminals, devices, or systems over the communication network 2. Before initiating a call with a target destination terminal, the transmitting/receiving unit 11 starts receiving status information of each of the terminals that are candidates for the destination from the management system 50. The status information not only indicate the operation status (on-line or off-line) of the terminal 10, but also detailed status of the terminal 10, e.g., the terminal is on-line and is available for receiving a call, the terminal is currently calling, or a user is not seated. In addition to the operation of status of the terminal 10, status information indicates various types of status, such as a status indicating that the cable 120c is disconnected from the terminal 10, a status indicating that no sound but an image is output, or a status indicating that no sound is output (MUTE). The status information includes a status indicating that a non-dedicated terminal function is running, as mentioned earlier. Described below is an example in which the status information indicates an operation status.

The operation input receiving unit 12 is realized by an instruction from the CPU 101 illustrated in FIG. 7, and the operation button 108 and the power switch 109 illustrated in FIG. 7. The operation input receiving unit 12 receives various inputs from a user. For example, when a user turns ON the power switch 109 illustrated in FIG. 7, the operation input receiving unit 12 illustrated in FIG. 9 receives the power-ON, and turns the power ON.

The log-in requesting unit 13 is realized by an instruction from the CPU 101 illustrated in FIG. 7. The log-in requesting unit 13 is triggered by receiving the power-ON, and automatically transmits log-in request information requesting to log in from the management system 50 and a current IP address of the request source terminal to the management system 50 via the transmitting/receiving unit 11 over the communication network 2. When the user changes the status of the power switch 109 from ON to OFF, the transmitting/receiving unit 11 is caused to transmit the status information indicating that the power is turned OFF to the management system 50, and the operation input receiving unit 12 then completely shuts the power OFF. In this manner, the management system 50 can recognize that the power of the terminal 10 is switched from ON to OFF.

The image capturing unit 14 is realized by an instruction from the CPU 101 illustrated in FIG. 7, and the camera 112 and the imaging element I/F 113 illustrated in FIG. 7. The image capturing unit 14 captures an image of a subject, and outputs the image data acquired by capturing.

The audio input unit 15a is realized by an instruction from the CPU 101 illustrated in FIG. 7 and the audio input/output I/F 116 illustrated in FIG. 7. The audio input unit 15a receives audio data related to an audio signal which is a user's voice converted by the microphone 114. The audio output unit 15b is realized by an instruction from the CPU 101 illustrated in FIG. 7 and the audio input/output I/F 116 illustrated in FIG. 7. The audio output unit 15b outputs an audio signal related to audio data, and causes the speaker 115 to output sound.

The display controlling unit 16 is realized by an instruction from the CPU 101 illustrated in FIG. 7 and the display I/F 117 illustrated in FIG. 7. The display controlling unit 16 controls to combine pieces of image data at different resolutions and to transmit the image data thus combined to the display 120, in a manner to be described later. The display controlling unit 16 is also capable of transmitting information of a destination list received from the management system 50 to the display 120, and causing the display 120 to display the destination list.

The display controlling unit 16 searches visual information management table (see FIG. 10) using the operation status information received from the management system 50 via the transmitting/receiving unit 11 as a search key, extracts matching visual information, and causes the display 120 on the local terminal 10 to display the visual information included in the destination list.

The starting unit 17 determines if any call initiating request is received by the transmitting/receiving unit 11 from another dedicated terminal (or another terminal running the dedicated terminal function). The starting unit 17 also starts one of the dedicated terminal function and the non-dedicated terminal function. The starting unit 17 also stops the dedicated terminal function or the non-dedicated terminal function currently running.

Figure 20:
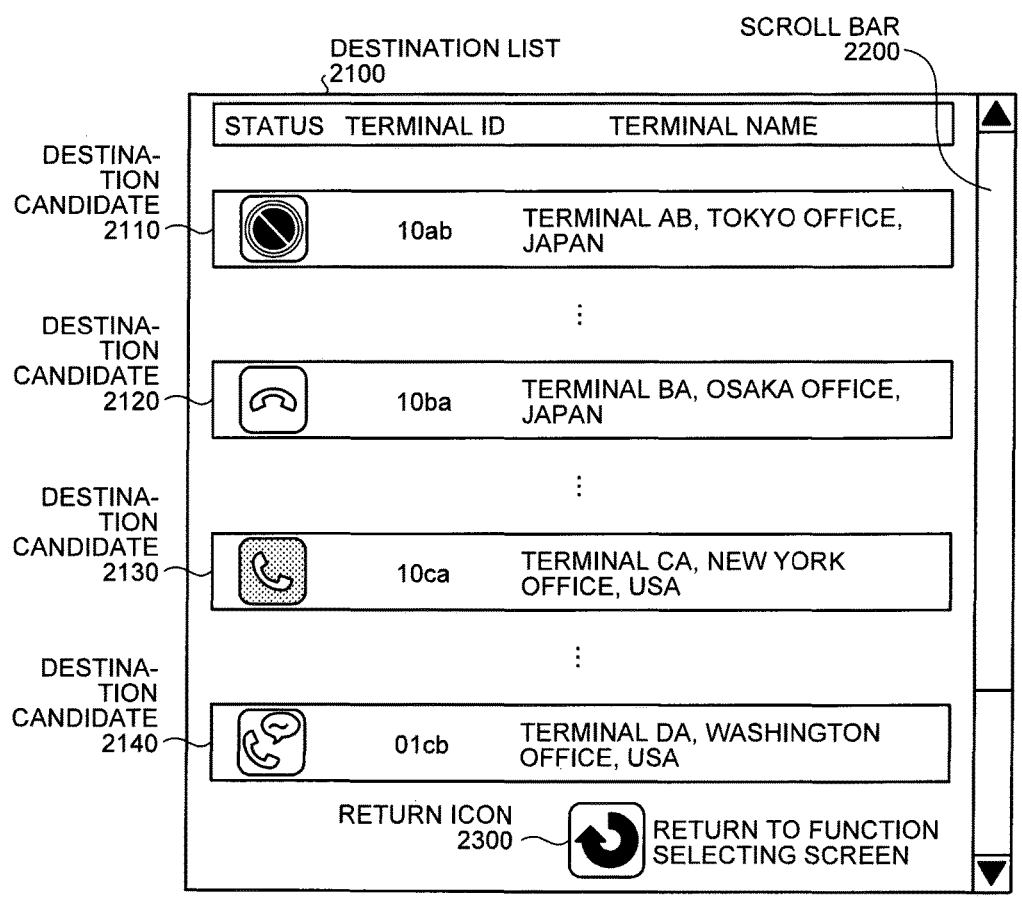
FIG. 20 is a conceptual schematic illustrating a destination list.

The destination list creating unit 18 creates and updates a destination list in which an icon is used to indicate the status of each of the destination candidates, as illustrated in FIG. 20, based on destination list information and status information, which is to be described later, of each of the terminals 10 that are destination candidates received from the management system 50.

The storing/reading processing unit 19 is caused to execute by an instruction from the CPU 101 illustrated in FIG. 7 and by the SSD 105 illustrated in FIG. 7, or realized by an instruction from the CPU 101. The storing/reading processing unit 19 performs a process of storing various types of data in the storage unit 1000, and a process of reading various types of data stored in the storage unit 1000. A terminal identification (ID) for identifying a terminal 10, a password, and the like are stored in the storage unit 1000. Image data and audio data received every time a call is established with a destination terminal is also stored in the storage unit 1000 in a manner overwriting previous data every time such data is received. An image is displayed on the display 120 based on the image data before being overwritten, and sound is output from the speaker 115 based in the audio data before being overwritten.

A terminal ID and a relay device ID to be described later according to the embodiment are identification information such as a language, a character, a symbol, or various types of marks used as a unique identification of the terminal 10 and the relay device 30, respectively. A terminal ID and a relay device ID may be identification information consisting of a combination of at least two of a language, a character, a symbol, and various marks described above.

Functional Units in Relay Device

The relay device 30 includes a transmitting/receiving unit 31 and a data quality changing unit 32. Each of these units is a function or a unit realized by causing one of the units illustrated in FIG. 8 to operate based on an instruction from the CPU 201 following a computer program for the relay device 30 that is loaded from the HD 204 onto the RAM 203.

Each Functional Unit in Relay Device

Each of the functional units in the relay device 30 will now be explained in detail. While explaining each of the functional units in the relay device 30, a relationship with some of the units illustrated in FIG. 8 that are mainly used in realizing the functional unit of the relay device 30 will be explained as well.

The transmitting/receiving unit 31 in the relay device 30 illustrated in FIG. 9 is realized by an instruction from the CPU 201 illustrated in FIG. 8, and the network I/F 209 illustrated in FIG. 8. The transmitting/receiving unit 31 transmits and receives various types of data (or information) to and from other terminals, devices, or systems over the communication network 2. The transmitting/receiving unit 31 enables the relay device 30 to relay communication data exchanged between the terminals 10.

The transmitting/receiving unit 31 also transmits session initiating information for giving an instruction to initiate a communication session (first communication session sed1) to a destination identified by the IP address of a request source terminal, among the IP addresses received by the transmitting/receiving unit 31. The transmitting/receiving unit 31 also transmits session initiating information for initiating a communication session (second communication session) and the IP address of the destination terminal to the destination identified by the IP address, among the IP addresses received by the transmitting/receiving unit 31.

The data quality changing unit 32 is realized by an instruction from the CPU 201 illustrated in FIG. 8. The data quality changing unit 32 changes the image quality of the image data received from a source terminal. This functional unit enables the relay device 30 to reduce the image quality of the image data to be relayed when there is a delay in the image data received by the terminal 10, e.g., due to a congestion in the communication network 2, so that the delay is compensated. For example, the delay is compensated by stopping to relay the high-resolution image data (see FIG. 3(c)) among the image data of three different image qualities, for example, when a delay occurs in receptions of the image data.

Functional Configuration of Management System

The management system 50 includes a transmitting/receiving unit 51, a terminal authenticating unit 52, a status managing unit 53, an extracting unit 54, a determining unit 55, a session managing unit 56, a converting unit 57, and a storing/reading processing unit 59. Each of these functions is a function or a unit realized by causing one of the units illustrated in FIG. 8 to operate based on an instruction from the CPU 201 following a computer program for the management system 50 that is loaded from the HD 204 onto the RAM 203. The management system 50 also includes a storage unit 5000 implemented by the HD 204 illustrated in FIG. 8. Stored in the storage unit 5000 is frame data for a destination list, which will be described later, and conversion rule data that is used in converting signaling protocols.

Relay Device Management Table

FIG. 11 is a conceptual schematic illustrating a relay device management table. Implemented in the storage unit 5000 is a relay device management DB 5001 that is implemented as a relay device management table, as illustrated in FIG. 11. The relay device management table manages, for each relay device ID corresponding to each of the relay devices 30, the operation status of the relay device 30, the time and the date at which the status information indicating the operation status is received by the management system 50, the IP address of the relay device 30, and the maximum data communication rate (megabits per second) in the relay device 30, in an associated manner. For example, the relay device management table illustrated in FIG. 11 indicates, for the relay device 30a having a relay device ID "111a", that the operation status is "on-line", the status information is received by the management system 50 at "2011.11.10.13:00", the IP address of the relay device 30a is "1.2.1.2", and the maximum data communication rate in the relay device 30a is 100 megabits per second.

Terminal Authentication Management Table

FIG. 12 is a conceptual schematic illustrating a terminal authentication management table. Implemented on the storage unit 5000 is a terminal authentication management DB 5002 that is implemented as a terminal authentication management table, as illustrated in FIG. 12. The terminal authentication management table manages an authentication password and a terminal ID corresponding to each of the terminals 10 managed by the management system 50, in an associated manner. For example, the terminal authentication management table illustrated in FIG. 12 indicates that the terminal ID of the terminal 10aa is "01aa", and the password is "aaaa".

Terminal Status Management Table

FIG. 13 is a conceptual schematic illustrating a terminal status management table. Implemented on the storage unit 5000 is a terminal status management DB 5003 that is implemented as a terminal status management table, as illustrated in FIG. 13. The terminal status management table manages, for each of the terminal IDs corresponding to each of the terminals 10, a destination name that is used when the terminal 10 is designated as a destination, the operation status of the terminal 10, the time and the date at which log-in request information, which will be described later, is received by the management system 50, and the IP address of the terminal 10, in an associated manner. For example, the terminal status management table illustrated in FIG. 13 indicates that the terminal 10aa with a terminal ID "01aa" has a terminal name "terminal AA, Tokyo Office, Japan", an operation status "on-line (available)", the log-in request information is received by the management system 50 at "2011.11.10.13:40", and the IP address of the terminal 10aa is "1.2.1.3".

The terminal status management table does not manage the terminal information such as the terminal. IDs, the terminal names, the operation statuses, the receiving time and date, and the IP addresses of the non-dedicated terminals 10 (in other words, terminals other than the terminals having the dedicated terminal function and dedicated terminals) because such terminal information is out of the scope of management.

Destination List Management Table

FIG. 14 is a conceptual schematic illustrating a destination list management table. Implemented on the storage unit 5000 is a destination list management DB 5004 that is implemented as a destination list management table, as illustrated in FIG. 14. The destination list management table manages terminal IDs of all of the destination terminals registered as a destination candidate and the terminal ID of a request source terminal requesting a call to be initiated, in an associated manner. For example, the destination list management table illustrated in FIG. 14 indicates that a request source terminal with a terminal ID "01aa" (terminal 10aa) can request a call from destination terminal candidates including a terminal 10ab with a terminal ID "01ab", a terminal 10ba with a terminal ID "01ba", and a terminal 10bb with a terminal ID "01bb". The destination terminal candidates are updated by adding or deleting a terminal ID in response to a request for adding or deleting the terminal issued by a request source terminal to the management system 50. The destination list management table (see FIG. 14) does not manage the terminal IDs of the non-dedicated terminals because such terminal IDs are out of the scope of management in the same manner as the terminal status management table.

Session Management Table

FIG. 15 is a conceptual schematic illustrating a session management table. Implemented on the storage unit 5000 is a session management DB 5005 that is implemented as a session management table, as illustrated in FIG. 15. The session management table manages the relay device ID of a relay device 30 used in relaying communication data (image data and audio data), the terminal ID of the request source terminal, the terminal ID of the destination terminal, the receiving delay time (milliseconds) by which the image data is received by the destination terminal, and the time and the date at which delay time information indicating the delay time and transmitted from the destination terminal is received by the management system 50, in an associated manner.

For example, the session management table illustrated in FIG. 15 indicates that a relay device 30a (relay device ID "111a") relays image data and audio data between a request source terminal with a terminal ID "01aa" (terminal 10aa) and a destination terminal with a terminal ID "01ca" (terminal 10ca), and the delay time of the image data at the destination terminal (terminal 10ca) as of "2011.11.10.14:00" is 200 milliseconds. When communication is to be established between two terminals 10, the time and the date at which the delay time information is received may be managed based on the delay time information received from the request source terminal, not the delay time information received from the destination terminal. When communication is to be established between three or more terminals 10, the time and the date at which the delay time information is received is managed based on the delay time information received from the terminal 10 receiving the image data and the audio data.

Each Functional Unit in Management System

Each of the functional units in the management system 50 will now be explained in detail. While explaining each of the functional units in the management system 50, a relationship with some of the units illustrated in FIG. 8 that are mainly used in realizing the functional unit of the management system 50 will be explained as well.

The transmitting/receiving unit 51 is caused to execute by an instruction from the CPU 201 illustrated in FIG. 8 and the network I/F 209 illustrated in FIG. 8. The transmitting/receiving unit 51 transmits and receives various types of data (or information) to and from other terminals, devices, or systems over the communication network 2.

The terminal authenticating unit 52 is realized by an instruction from the CPU 201 illustrated in FIG. 8. The terminal authenticating unit 52 authenticates a terminal by searching the terminal authentication management table (see FIG. 12) using the terminal ID and the password included in the log-in request information received via the transmitting/receiving unit 51 as a search key, and by determining if a matching terminal ID and password are managed in the terminal authentication management table.

The status managing unit 53 is realized by an instruction from the CPU 201 illustrated in FIG. 8. To manage the operation status of a request source terminal requesting to log in, the status managing unit 53 manages the terminal ID of the request source terminal, the operation status of the request source terminal, the time and the date at which the log-in request information is received by the management system 50, and the IP address of the request source terminal in the terminal status management table (see FIG. 13) in an associated manner. When a user switches the power switch 109 of the terminal 10 from ON to OFF, the status managing unit 53 switches the on-line operation status to the off-line status in the terminal status management table (see FIG. 13), based on the status information indicating that the power is turned OFF received from the terminal 10.

The extracting unit 54 is realized by an instruction from the CPU 201 illustrated in FIG. 8. The extracting unit 54 searches corresponding management DB implemented on the storage unit 5000 using various types of a search key, and extracts data (information) corresponding to the search key as a search result.

For example, the extracting unit 54 searches the destination list management table (see FIG. 14) using the terminal ID of a request source terminal requesting to log in as a key, and extracts terminal IDs of the destination terminal candidates that are available for communication with the request source terminal. The extracting unit 54 then searches terminal status table (see FIG. 13) using the terminal IDs of the destination terminal candidates as search keys, and extracts an operation status for each of the terminal IDs. This process allows the extracting unit 54 to acquire the operation status of a destination terminal candidate available for communication with a request source terminal requesting to log in.

The extracting unit 54 also searches the destination list management table (see FIG. 14) using the terminal ID of the request source terminal requesting to log in as a key, and extracts the terminal ID of another request source terminal having registered the terminal ID of the request source terminal as a destination terminal candidate. The extracting unit 54 also acquires operation status of a request source terminal requesting to log in by searching the terminal status management table (see FIG. 13) using the terminal ID as a search key.

The extracting unit 54 also searches the terminal status management table (see FIG. 13) using the terminal ID of a terminal 10 received by the transmitting/receiving unit 51 as a search key, and extracts the IP address of the corresponding terminal 10. The extracting unit 54 also searches the terminal status management table (see FIG. 13) using the IP address of a destination terminal as a search key, and extracts the corresponding terminal ID.

The determining unit 55 is realized by an instruction from the CPU 201 illustrated in FIG. 8, and determines if the operation status indicated by the operation status information is "on-line". If the operation status is determined to be "on-line", the determining unit 55 further determines that the operation status information can be transmitted to a given terminal 10. If the determining unit 55 determines that the operation status is not "on-line", the determining unit 55 determines that the operation status information cannot be transmitted to the given terminal 10.

The session managing unit 56 is realized by an instruction from the CPU 201 illustrated in FIG. 8, and stores and manages the relay device ID of the relay device 30 to be used in relaying the communication data, the terminal ID of the request source terminal, the terminal ID of the destination terminal, a receiving delay time (milliseconds) by which the image data is received by the destination terminal, and the time and the date at which the delay time information indicating the delay time transmitted by the destination terminal is received by the management system 50 in the session management table (see FIG. 15) implemented on the storage unit 5000 in an associated manner. The session managing unit 56 also generates a session ID that is used in establishing a communication session.

When the operation status corresponding to the terminal ID of the request source terminal indicates that the non-dedicated terminal function has been started in the terminal status management table, the converting unit 57 performs signaling and conversion of the signaling protocol received from the request source terminal into a signaling protocol received from the destination terminal and vice versa, based on the conversion rule data stored in the storage unit 5000 in advance.

The storing/reading processing unit 59 is executed by an instruction from the CPU 201 illustrated in FIG. 8 and the HDD 205 illustrated in FIG. 8, and performs a process of storing various types of data in the storage unit 5000 and reading various types of data stored in the storage unit 5000.

Process or Operation According to Embodiment

Figure 16:
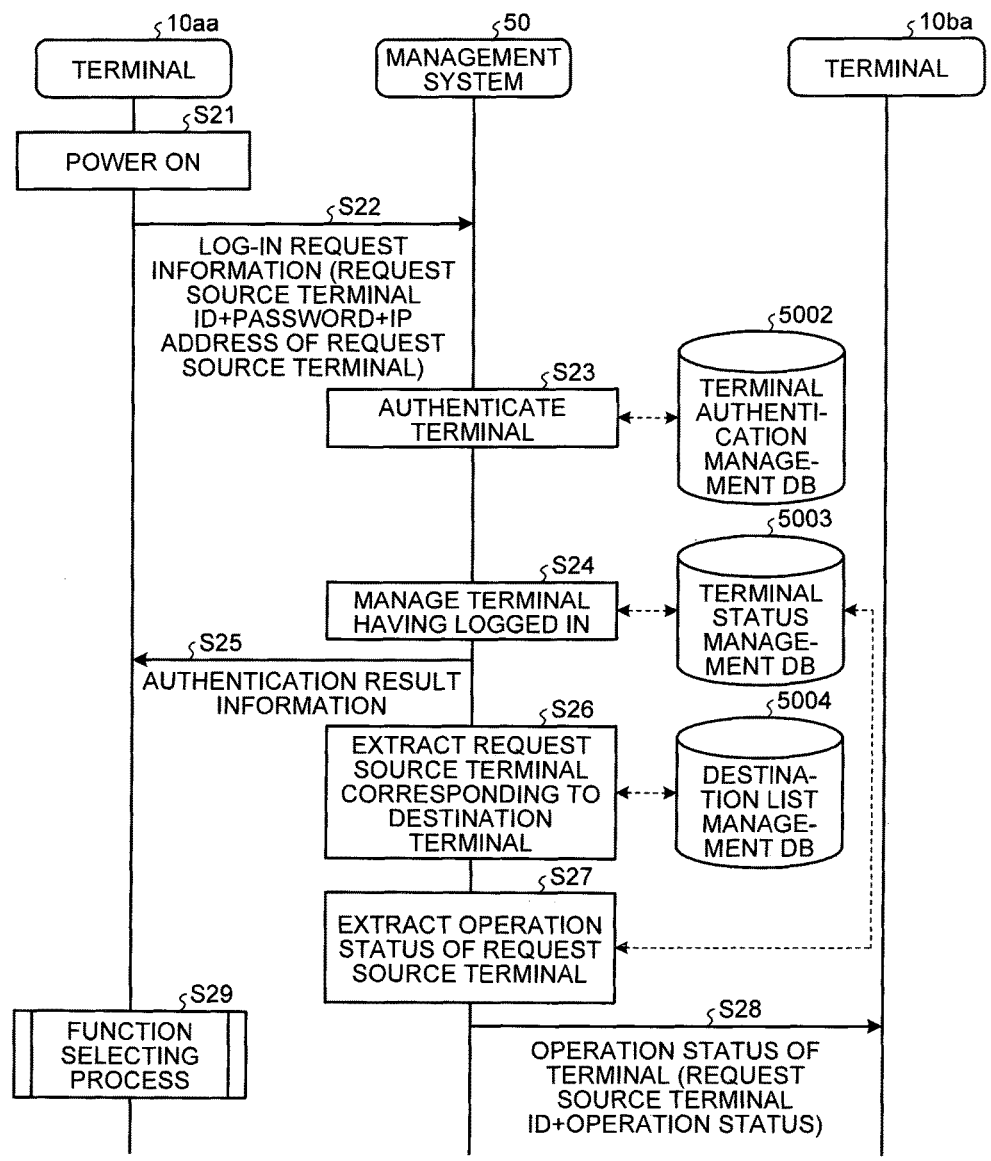
FIG. 16 is a sequence chart illustrating a process of preparing for initiation of a call between terminals.

Explained now with reference to FIGS. 6, 9, and 16 to 20 is an example in which the terminal 10 having the dedicated terminal function and the non-dedicated terminal function is a request source terminal. FIG. 16 is a sequence chart illustrating a call initiating request.

As illustrated in FIG. 16, when a user of a dual codec request source terminal (terminal 10aa) turns ON the power switch 109 illustrated in FIG. 6, the operation input receiving unit 12 illustrated in FIG. 9 receives the power ON and turns the power ON (Step S21). The log-in requesting unit 13 is triggered by the reception of the power-ON, automatically transmits log-in request information, indicating a log-in request from the transmitting/receiving unit 11 to the management system 50 over the communication network 2 (Step S22). The log-in request information includes the terminal ID for identifying the terminal 10aa that is a request source terminal and a password. The terminal ID and the password are data that is read from the storage unit 1000 via the storing/reading processing unit 19, and transmitted to the transmitting/receiving unit 11. When the log-in request information is transmitted from the request source terminal (terminal 10aa) to the management system 50, the management system 50 that is a receiver can recognize the IP address of the terminal 10aa that is a transmitter.

The terminal authenticating unit 52 in the management system 50 then searches the terminal authentication management table (see FIG. 12), using the terminal ID and the password included in the log-in request information received via the transmitting/receiving unit 51 as search keys, and authenticates the terminal by determining if the matching terminal ID and password are managed in the terminal authentication management table (Step S23). Because the matching terminal ID and password are managed by the terminal authenticating unit 52, when a log-in request is determined to be issued by a terminal 10 with a valid access, the status managing unit 53 stores the operation status and the receiving time and date at which the log-in request information is received in the terminal status management table (see FIG. 13) in a manner associated with the IP address of the terminal 10aa, for each record indexed with the terminal ID of the terminal 10aa and the destination name (Step S24). Through this process, the operation status "on-line", the receiving time and date "2011.11.10.13:40", and the terminal IP address "1.2.1.3" are stored in the terminal status management table in a manner associated with the terminal ID "01aa" and the destination name.

The transmitting/receiving unit 51 in the management system 50 transmits authentication result information indicating the authentication result acquired by the terminal authenticating unit 52 to the request source terminal having requested to log in (terminal 10aa) over the communication network 2 (Step S25). Explained now is a process performed when the terminal authenticating unit 52 determines that the terminal has a valid access in the embodiment.

The extracting unit 54 in the management system 50 searches the destination list management table (see FIG. 14) using the terminal ID "01aa" of the request source terminal having requested to log in (terminal 10aa), and extracts terminal IDs of other request source terminals having registered the terminal ID "01aa" of the request source terminal (terminal 10aa) as a destination terminal candidate (Step S26). To simplify the explanation, explained below is an example in which the terminal ID extracted at Step S26 is the terminal ID "01ba" of the terminal 10ba.

The extracting unit 54 in the management system 50 then searches the terminal status management table (see FIG. 13) using the terminal ID "01aa" of the request source terminal (terminal 10aa) having requested to log in as a search key, and extracts the operation status of the request source terminal having requested to log in (terminal 10aa) (Step S27).

The transmitting/receiving unit 51 then transmits "terminal status information" including the terminal ID "01aa" of the request source terminal (terminal 10aa) and the operation status information indicating the operation status of the request source terminal (terminal 10aa) to the terminal 10ba (Step S28). Through this process, the transmitting/receiving unit in the terminal 10ca receives the terminal status information. The terminal 10ba then creates a destination list reflected with the latest operation status of the terminal 10aa, in the same manner as the process at Step S28 to be described later, and displays the destination list on the display 120ba.

Figure 17:
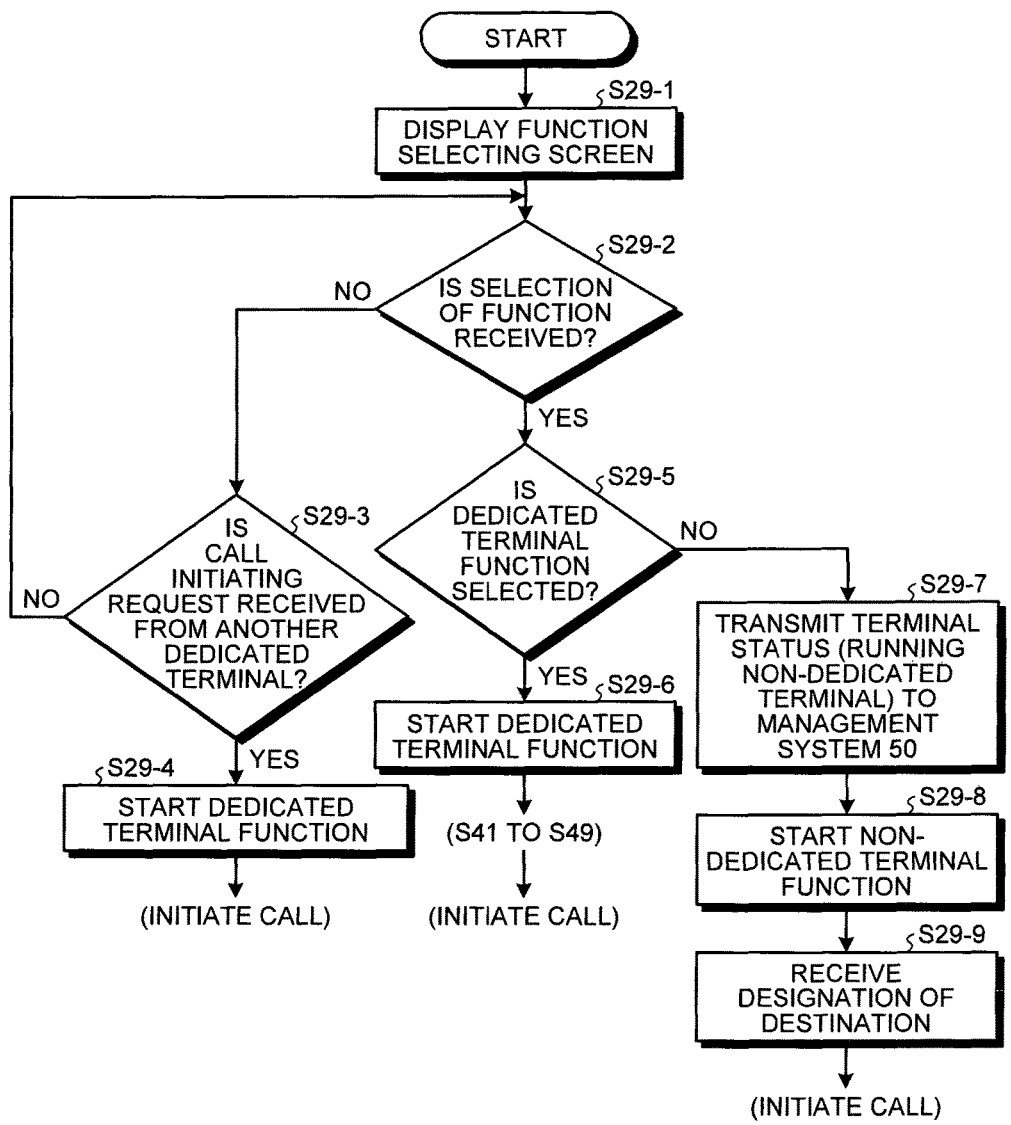
FIG. 17 is a flowchart illustrating a process of selecting a dedicated terminal function or a non-dedicated terminal function.

The request source terminal (terminal 10aa) then performs a process of selecting one of the dedicated terminal function and the non-dedicated terminal function (Step S29). The process of selecting the functions will now be explained more in detail with reference to FIG. 17. FIG. 17 is a flowchart of a process of selecting the dedicated terminal function or the non-dedicated terminal function.

Figure 18:
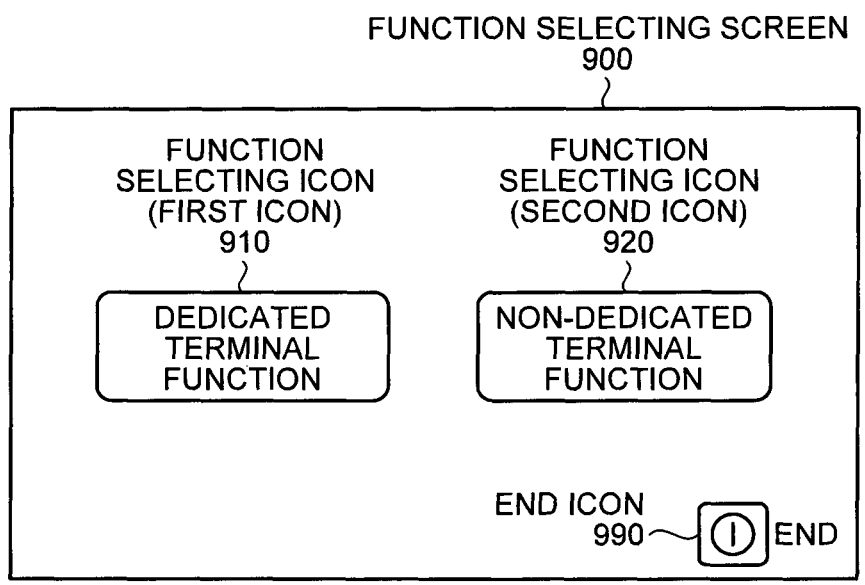
FIG. 18 is a conceptual schematic illustrating a communication function selecting screen.

To begin with, the display controlling unit 16 in the request source terminal (terminal 10aa) displays a function selecting screen 900 on the display 120aa as illustrated in FIG. 18 (Step S29-1). FIG. 18 is a conceptual schematic illustrating a communication function selecting screen. As illustrated in FIG. 18, a function selecting icon 910 (an example of a first icon) for starting the dedicated terminal function and a function selecting icon 920 for starting the non-dedicated terminal function (an example of the second icon) are displayed side by side in the function selecting screen 900. In the lower right side in the function selecting screen 900, an end icon 990 for ending the process of selecting the functions is displayed.

The operation input receiving unit 12 in the request source terminal (terminal 10aa) determines which one of the function selecting icon 910 and the function selecting icon 920 illustrated in FIG. 18 is selected by the user (Step S29-2). If the operation input receiving unit 12 determines that neither one of these icons are selected at Step S29-2, the transmitting/receiving unit 11 further determines if any call initiating request is received from another dedicated terminal (or another terminal running the dedicated terminal function) (Step S29-3). If the transmitting/receiving unit 11 determines that no call initiating request is received at Step S29-3 (No), the system control returns to Step S29-1. If the transmitting/receiving unit 11 determines that a call initiating request is received at Step S29-3 (Yes), the starting unit 17 initiates the dedicated terminal function (Step S29-4). Through this process, the terminal 10aa can start communication as a dedicated terminal.

At Step S29-2, if the operation input receiving unit 12 determines that one of the function selecting icon 910 or the function selecting icon 920 is selected, the operation input receiving unit 12 determines if the function selecting icon 910 for starting the dedicated terminal function is selected (Step S29-5). If the operation input receiving unit 12 determines that the function selecting icon 910 is selected at Step S29-5, the starting unit 17 initiates the dedicated terminal function (Step S29-6). In this case, the terminal 10aa can start communication as a dedicated terminal through the process at Steps S41 to S49 to be described later.

If the operation input receiving unit 12 determines that the function selecting icon 910 is not selected (determines that the function selecting icon 920 is selected) at Step S29-5, the transmitting/receiving unit 11 in the request source terminal (terminal 10aa) transmits the terminal status information indicating that the non-dedicated terminal function is running to the management system 50 (Step S29-7). By transmitting the terminal status information, the management system 50 is caused to update the operation status of the terminal ID corresponding to the terminal 10aa in the terminal status management table to a status indicating that the non-dedicated terminal function is running. The starting unit 17 in the request source terminal (terminal 10aa) then starts the non-dedicated terminal function (Step S29-8). When the request source terminal (terminal 10aa) functions as a non-dedicated terminal, because the destination list illustrated in FIG. 20, which will be described later, is not displayed, the user need to enter address information that allows the location of the destination terminal to be identified (e.g., the IP address) to designate the destination. Once the user enters the IP address of the designation terminal (non-dedicated terminal), for example, the operation input receiving unit 12 receives the designation of the destination (Step S29-9). Through this process, the request source terminal (terminal 10aa) can start communication as a non-dedicated terminal.

Specifically, the request source terminal transmits a call initiating request addressed to the IP address thus entered to the management system 50, and, because the terminal status management table indicates the operation status of the terminal ID of the request source terminal being running the non-dedicated terminal function, the management system 50 causes the converting unit 57 to convert the call initiating request thus received into data according to the conversion data rule (that is, data according to the signaling protocol of the non-dedicated terminal). The call initiating request thus converted is transmitted to the destination terminal (non-dedicated terminal), based on the IP address received from the management system 50. If the destination terminal (non-dedicated terminal) receiving the call initiating request is available for communication, the destination terminal responds to the management system 50. After the management system 50 coverts the response according to the conversion data rule, in the same manner as the call initiating request, the management system 50 forwards the response to the request source terminal. Through such a sequence of signaling process, a communication session sed can be established between the request source terminal and the destination terminal, as illustrated in FIG. 4. In the example illustrated in FIG. 4, because the request source terminal is running the non-dedicated terminal function, the AVC encoding protocol, which is the same as that used on the destination terminal (non-dedicated terminal), is used as the encoding protocol.

At Step S29-9, the IP address is entered by a user. Alternatively, the location information of the non-dedicated terminal such as the IP address may be stored in the terminal 10 in advance, and made available for selection by a user.

Figure 19:
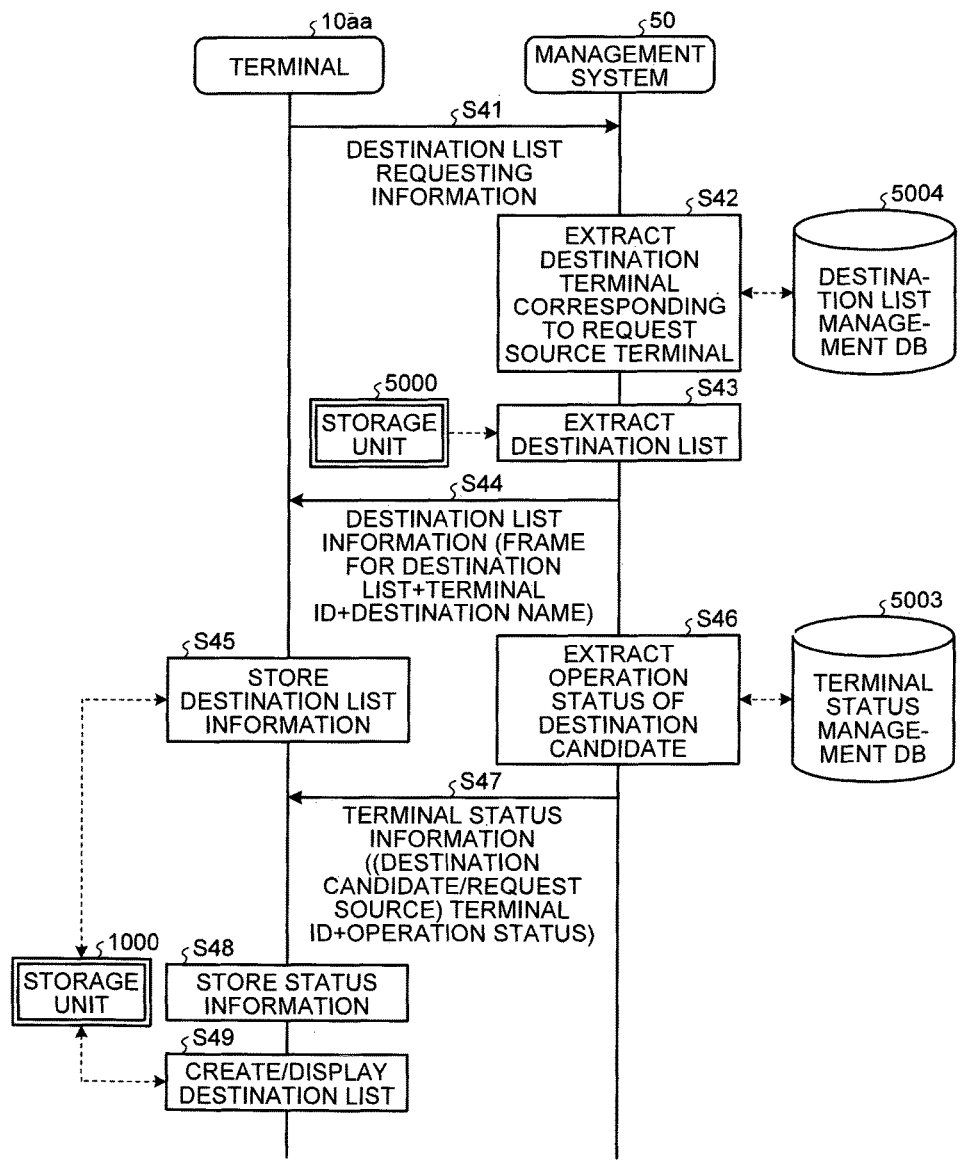
FIG. 19 is a flowchart illustrating a process of displaying a destination list.

The process for initiating communication after the process at Step S29-6 illustrated in FIG. 17 will now be explained with reference to FIGS. 19 and 20. FIG. 19 is a flowchart illustrating a process of displaying a destination list. FIG. 20 is a conceptual schematic illustrating a destination list.

To begin with, in the request source terminal (terminal 10aa), upon receiving the authentication result information indicating a result that the request source terminal is determined to have a valid access at Step S25, the transmitting/receiving unit 11 transmits destination list requesting information requesting a destination list to the management system 50 over the communication network 2 (Step S41). The transmitting/receiving unit 51 in the management system 50 then receives the destination list requesting information.

The extracting unit 54 in the management system 50 searches the destination list management table (see FIG. 14) using terminal ID "01aa" of the request source terminal (terminal 10aa) having requested to log in as a search key, and extracts the terminal IDs of the destination terminal candidates available for communication with the request source terminal (terminal 10aa). The extracting unit 54 then uses the terminal IDs as search keys to search the terminal status management table (see FIG. 13), and extracts corresponding destination name information (Step S42). To simplify the explanation, explained below is an example in which the terminal IDs of a terminal 10ab, a terminal 10ba a terminal 10ca, a terminal 10cb, and the like that are dedicated terminals A are extracted as terminals 10 being the destination terminal candidates.

The extracting unit 54 then reads the frame data of the destination list from the storage unit 5000 (Step S43). The transmitting/receiving unit 51 then transmits "destination list information (the frame of the destination list, the terminal IDs, and the destination names)" including the frame of the destination list, and the terminal IDs and destination name information extracted at Step S42 to the request source terminal (terminal 10aa) (Step S44). The transmitting/receiving unit 11 in the request source terminal (terminal 10aa) receives the destination list information.

The storing/reading processing unit 19 in the request source terminal (terminal 10aa) then stores the destination list information in the storage unit 1000 (Step S45).

In the manner described above, in the embodiment, instead of managing the destination list information on each of the terminals 10, the management system 50 centrally manages the destination list information of all of the terminals. Therefore, when a new terminal 10 is started to be used in the communication system 1, when a terminal 10 currently being used is replaced with a terminal 10 of a new model, or when the appearance of the frame of a destination list is changed, for example, such changes are made centrally on the management system 50, and the work to be done on each of the terminals 10 to change the destination list information can be omitted.

In the management system 50, the extracting unit 54 extracts the operation status of the terminals 10 that are the destination terminal candidates (Step S46).

The transmitting/receiving unit 51 then transmits the "terminal status information" including the terminal ID "01ca", which is used as a search key at Step S42, and "on-line (available)" which is the operation status of the destination terminal (terminal 10ca) to the request source terminal (terminal 10aa) over the communication network 2 (Step S47). The transmitting/receiving unit 51 may transmit the "terminal status information" indicating the terminal ID and the operation status of the terminal (terminal 10aa) to the request source terminal (terminal 10aa).

The storing/reading processing unit 19 in the request source terminal (terminal 10aa) sequentially stores the terminal status information received from the management system 50 in the storage unit 1000 (Step S48). In this manner, the request source terminal (terminal 10aa) can acquire the current operation status of other terminals 10 that are available for communication with the request source terminal (terminal 10aa), by receiving the terminal status information of each of the candidate terminals.

The destination list creating unit 18 in the request source terminal (terminal 10aa) then creates a destination list 2100 in which the statuses of the destination candidate terminals 10 are reflected based on the destination list information and the terminal status information stored in the storage unit 1000, and the display controlling unit 16 displays the destination list 2100, as illustrated in FIG. 20 on the display 120aa illustrated in FIG. 1 (Step S49). The following process is performed to reflect the statuses of the terminals 10 to the destination list. The destination list creating unit 18 searches the visual information management table (see FIG. 10) based on the terminal operation status information included in the terminal status information, and extracts the corresponding visual information. The destination list creating unit 18 then assigns the visual information thus extracted to the frame of the destination list in the destination list information, for each of the terminal IDs and the destination names included in the destination list information. In FIG. 20, the operation statuses of four destination candidates (2110, 2120, 2130, 2140) are indicated by icons, which are examples of the visual information. In this manner, the user can recognize the operation statuses of the destination candidates before initiating communication.

Displayed at the bottom of the destination list 2100 is a return icon 2300 (an example of a third icon) for returning back to the function selecting screen 900 illustrated in FIG. 18. On the right side of the destination list 2100, a scroll bar 2200 is displayed. When a user moves the scroll bar 2200 up and down, the visual information displayed in the destination list is caused to move up and down.

Main Advantages Achieved by Embodiment

As explained above, according to the embodiment, a plurality of types of communication functions can be used advantageously, even when the communication functions use communication systems in which the signaling protocols are the same but encoding protocols are different.

Supplement to Embodiment

In the embodiment, as illustrated in FIG. 18, a selection is made from two functions, but the present invention is not limited thereto, and a selection may be made from three or more functions.

Figure 21:
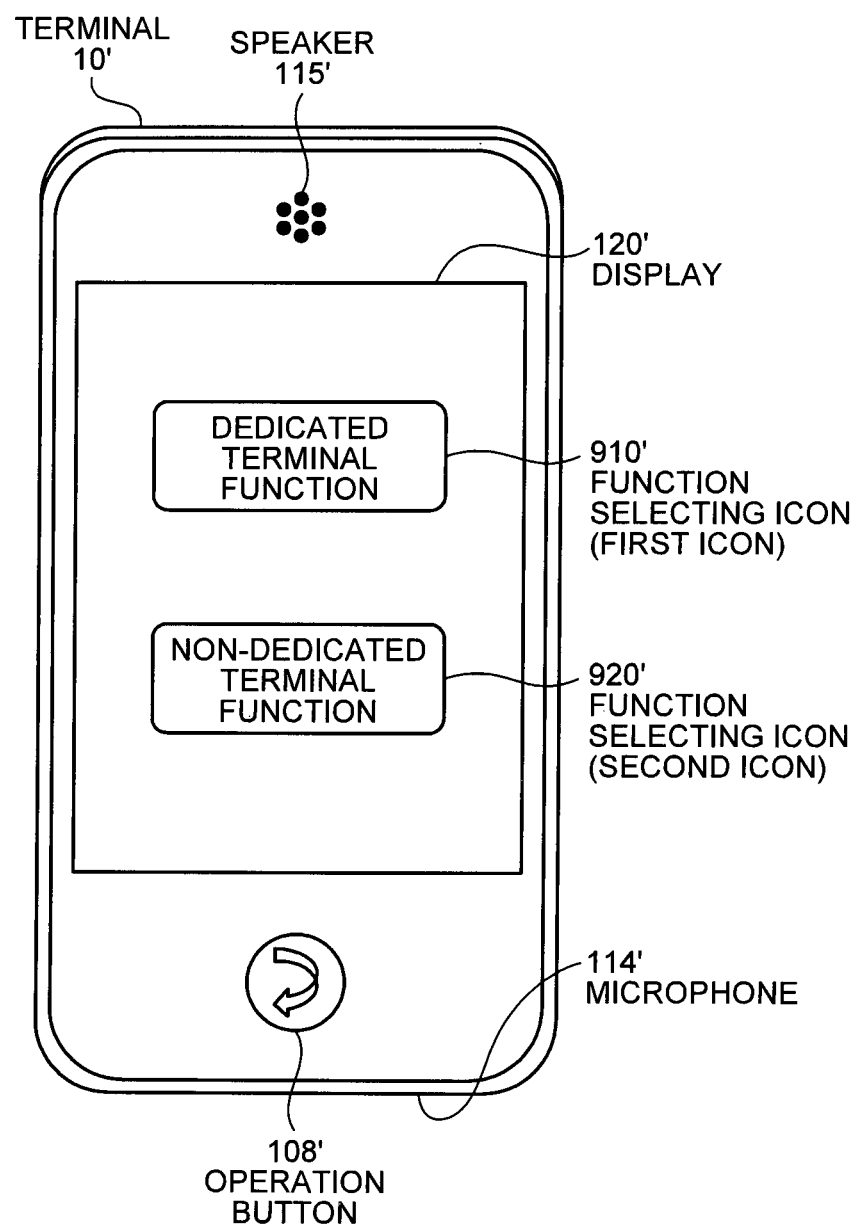
FIG. 21 is a conceptual schematic illustrating another example of the function selecting screen.
Figure 22:
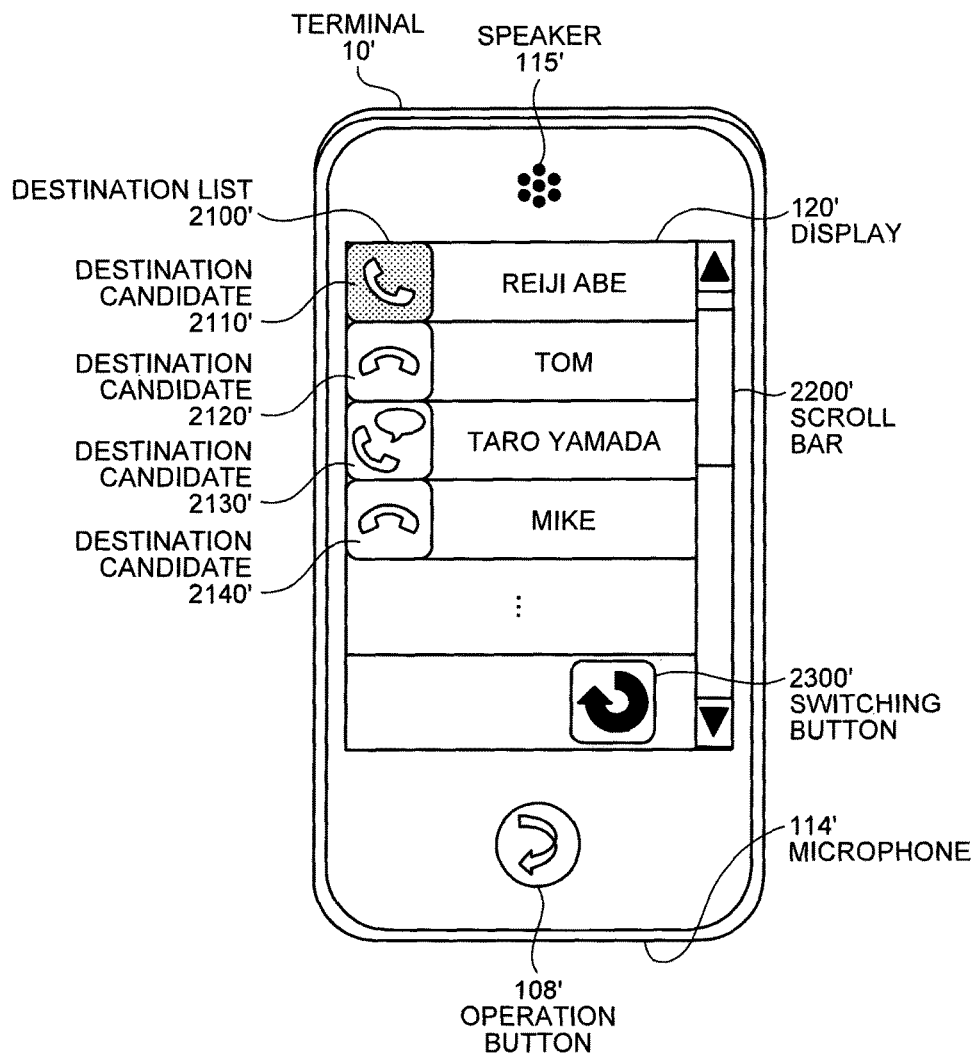
FIG. 22 is a conceptual schematic illustrating another example of the destination list.

In the embodiment, explained with reference to FIGS. 18 and 20 are icons displayed on the display 120 of the teleconference terminal which is an example of the communication terminal, but various types of icons may be displayed on a display 120' of a terminal 10' such as a smartphone, as illustrated in FIGS. 21 and 22. FIG. 21 is a conceptual schematic illustrating another example of the function selecting screen. FIG. 22 is a conceptual schematic illustrating another example of the destination list.

In FIGS. 21 and 22, a terminal 10', an operation button 108', a microphone 114', a speaker 115', a display 120', a function selecting icon 910', and a function selecting icon 920' correspond to the terminal 10, the operation button 108, the microphone 114, the speaker 115, the display 120, the function selecting icon 910, and the function selecting icon 920 on the teleconference terminal, respectively.

In FIG. 22, a destination list 2100', destination candidates (2110', 2120', 2130', 2140'), a scroll bar 2200', and a return icon 2300' correspond to the destination list 2100, the destination candidates (2110, 2120, 2130, 2140), the scroll bar 2200, and the return icon 2300, respectively, on the teleconference terminal.

The various types of icons illustrated in FIGS. 10, 18, and 20 may include characters or symbols in addition to the pictograms.

Furthermore, explained in the embodiment is an example in which image data and audio data are exchanged, but the present invention is not limited thereto, and only the audio data may be exchanged. Such a configuration would be incapable of achieving the advantages of the teleconference system, but can realize a conference only using voice, in the same manner as an ordinary telephone.

Each of the relay device 30, the management system 50, the program providing system 90, and the maintenance system 100 according to the embodiment may be implemented on a single computer, or may be distributed among a plurality of computers assigned with some of the units (functions or means) described above. When the program providing system 90 is configured as a single computer, the computer program transmitted by the program providing system 90 may be divided into a plurality of modules before transmitting, or may be transmitted without being divided. Furthermore, when the program providing system 90 is built on a plurality of computers, the computer program can be transmitted in a manner divided into a plurality of modules from each of the computers.

Furthermore, a recording medium such as a CD-ROM storing therein the computer program according to the embodiment, the HD 204 storing therein the computer program, and the program providing system 90 including the HD 204 may be made available domestically or to the overseas as a computer program product.

Furthermore, the receiving time and date is managed in FIGS. 11, 13, and 15, but the present invention is not limited thereto, and at least the receiving time, among the receiving time and date, may be managed.

Furthermore, in the embodiment, the IP address of the relay device is managed in FIG. 11, and the IP address of the terminal is managed in FIG. 13, but the present invention is not limited thereto, and the fully qualified domain name (FQDN) of the relay device 30 or of the terminal 10 may be managed, as long as such a name serves as destination information that allows the relay device 30 to be identified on the communication network 2 and the terminals 10 to be identified on the communication network 2. In such a case, a known domain name system (DNS) server acquires the IP address corresponding to the FQDN.

Furthermore, in the embodiment, a teleconference system is used as an example of the communication system 1, but the present invention is not limited thereto, and may be a telephone system such as an IP phone or an Internet phone. Furthermore, the communication system 1 may be an automotive navigation system. In such a case, for example, one terminal 10 corresponds to an automotive navigation device deployed on a vehicle, and the other terminal 10 corresponds to a management terminal or a management server in a management center where the automotive navigation system is managed, or corresponds to an automotive navigation device deployed on another vehicle. Furthermore, the communication system 1 may be a communication system of mobile phones. In such a case, the terminal 10 corresponds to a mobile phone, for example.

Furthermore, in the embodiment, image data and audio data are explained as examples of communication data, but the present invention is not limited thereto, and the communication data may be tactile data. In such a case, the feeling of a user touching one terminal is communicated to the other terminal. Furthermore, the communication data may be smell data. In such a case, the smell on one terminal is communicated to the other terminal. Furthermore, the communication data may be at least one of image data, audio data, tactile data, and smell data.

Furthermore, explained in the embodiment is an example in which a teleconference is held over the communication system 1, but the present invention is not limited thereto, and the communication system 1 may be used in a meeting, a general conversation among a family or between friends, or unidirectional presentation of information.

Furthermore, the external view of the communication terminal of the terminal illustrated in FIG. 6 is merely an example, and may be a smartphone, a tablet terminal, a mobile phone, or a general-purpose personal computer (PC). A microphone or a camera does not necessarily have to be provided internally, and may be provided externally.

Furthermore, the signaling protocol on the request source terminal is explained to be an instant messenger protocol (or an instant messenger protocol extension) in FIGS. 2 and 4, and the signaling protocol of the destination terminal is explained to be the SIP or H.323 in FIG. 4, but these protocols are merely examples, and may also be any signaling protocol other than those mentioned above.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A communication terminal, comprising:
processing circuitry configured to
cause a display, to display, prior to a video communication session, a function selecting screen that contains a first icon for receiving a selection of a first communication function and a second icon for receiving a selection of a second communication function, the first communication function being to provide video communication using a first encoding protocol for encapsulating communication data in internet protocol (IP) packets, the second communication function being to provide video communication using a second encoding protocol different from that of the first communication function;
receive, from a user of the communication terminal, a selection of the first icon or the second icon, selection of the first icon causing display of a destination list of destination candidates, and selection of the second icon causing the processing circuitry to receive a designated destination entered by the user;
display the destination list of destination candidates when the first icon is selected;
start the first communication function in response to the selection of the first icon and initiate a video communication session based on the first encoding protocol with a destination communication terminal selected from the displayed destination list using the first communication function; and start the second communication function in response to the selection of the second icon and initiate a video communication session based on the second encoding protocol with the designated destination communication terminal using the second communication function.

2. The communication terminal according to claim 1, wherein the processing circuitry is configured to start the first communication function when a communication initiating request issued on the first communication function is received from another communication terminal having only the first communication function, while the function selecting screen is displayed, but before the process circuitry receives the selection, and initiate a video communication session with the another communication terminal using the first communication function.

3. The communication terminal according to claim 1, further comprising a transmitter configured to transmit operation status information indicating that the second communication function is running to a communication management system for managing an operation status of the communication terminal when the receiver receives the selection of the second icon.

4. The communication terminal according to claim 1, wherein
the processing circuitry causes the display to display the destination list indicating an operation status of the destination candidates, and display, in addition to the destination list, a third icon for displaying the function selecting screen on the display,
the processing circuitry is configured to receive a selection of the third icon, and
the processing circuitry is configured to cause the display to display the function selecting screen when the selection of the third icon is received.

5. The communication terminal according to claim 1, wherein the communication data includes at least audio data.

6. The communication terminal of claim 1, wherein the first communication function provides video communication using a signaling protocol for connecting to or disconnecting from a destination of communication, and the second communication function uses the signaling protocol of the first communication function.

7. A communication function starting method, comprising:
displaying, on a display, prior to a video communication session, a function selecting screen that contains a first icon for receiving a selection of a first communication function and a second icon for receiving a selection of a second communication function, the first communication function being to provide video communication using a first encoding protocol for encapsulating communication data in internet protocol (IP) packets, the second communication function being to provide video communication using a second encoding protocol different from that of the first communication function;
receiving, from a user, a selection of the first icon or the second icon, selection of the first icon causing display of a destination list of destination candidates, and selection of the second icon causing receipt of a designated destination entered by the user;
displaying the destination list of destination candidates when the first icon is selected;
starting the first communication function, in response to the selection of the first icon, and initiating a video communication session based on the first encoding protocol with a destination communication terminal selected from the displayed destination list using the first communication function; and
starting the second communication function, in response to the selection of the second icon, and initiating a video communication session based on the second encoding protocol with the designated destination communication terminal using the second communication function.

8. A computer-readable recording medium with an executable program stored thereon, wherein the program instructs a computer to execute the communication function starting method according to claim 7.

9. The method of claim 7, further comprising starting the first communication function when a communication initiating request issued on the first communication function is received from another communication terminal having only the first communication function, while the function selecting screen is displayed but before the process circuitry receives the selection, and initiate a video communication session with the another communication terminal using the first communication function.

* * * * *